US010270867B2

(12) United States Patent
Kim

(10) Patent No.: US 10,270,867 B2
(45) Date of Patent: Apr. 23, 2019

(54) MOBILE APPARATUS, DISPLAY APPARATUS, AND MULTIMEDIA OUTPUT METHOD USING THE SAME

(71) Applicant: SAMSUNG ELECTRONICS CO., LTD., Suwon-si (KR)

(72) Inventor: Wan Su Kim, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 233 days.

(21) Appl. No.: 14/723,888

(22) Filed: May 28, 2015

(65) Prior Publication Data

US 2015/0350353 A1 Dec. 3, 2015

(30) Foreign Application Priority Data

May 28, 2014 (KR) .................. 10-2014-0064645
Jan. 5, 2015 (KR) .................. 10-2015-0000779

(51) Int. Cl.
*H04L 29/08* (2006.01)
*H04L 29/06* (2006.01)
(Continued)

(52) U.S. Cl.
CPC ............... *H04L 67/18* (2013.01); *G06F 1/26* (2013.01); *H04L 65/4076* (2013.01); *H04N 21/4122* (2013.01); *H04N 21/43615* (2013.01)

(58) Field of Classification Search
CPC . H04L 65/4076; H04L 67/18; H04N 21/4122; H04N 21/43615; H04W 4/04; H04W 4/06; H04W 88/02
See application file for complete search history.

(56) References Cited

U.S. PATENT DOCUMENTS 7,724,753 B2   5/2010   Naqvi et al.
8,683,007 B2   3/2014   Kashef et al.
(Continued)

FOREIGN PATENT DOCUMENTS

CN   103081494 A   5/2013
EP   2293562 A2 * 3/2011   ....... H04N 21/43615
(Continued)

OTHER PUBLICATIONS

"DIAL—Discovery and Launch protocol specification—Version 1.6.4", Retrieved from the Internet: URL:http://www.dial-multiscreen.org/dial-protocolspecification/DIAL-2ndScreenProtocol-1.6.4.pdf, Dec. 19, 2012, pp. 1-16, XP055076322.

(Continued)

*Primary Examiner* — Michael C Lai
(74) *Attorney, Agent, or Firm* — Sughrue Mion, PLLC

(57) ABSTRACT

Disclosed herein are a mobile apparatus which is configured for enabling multimedia content which is being output on the mobile apparatus to be output via a predetermined multimedia apparatus when the mobile apparatus is connected to a home network, a display apparatus, and a multimedia output method using the same. The multimedia content may include at least one of a picture, music, video, and text. The mobile apparatus includes: an output unit configured to output the multimedia content; and a controller configured to output, if the mobile apparatus enters a predetermined area, the multimedia content being output on the output unit via the predetermined external apparatus.

37 Claims, 28 Drawing Sheets

(51) Int. Cl.
*G06F 1/26* (2006.01)
*H04N 21/41* (2011.01)
*H04N 21/436* (2011.01)

(56) References Cited

U.S. PATENT DOCUMENTS

| | | | |
|---|---|---|---|
| 9,002,987 B2* | 4/2015 | Park, II | H04L 12/2809 345/418 |
| 9,369,776 B2* | 6/2016 | Lanier | G06Q 20/102 |
| 2006/0040638 A1* | 2/2006 | McQuaide, Jr. | H04L 12/2812 455/403 |
| 2006/0052081 A1* | 3/2006 | Cho | H04H 60/72 455/403 |
| 2007/0136488 A1* | 6/2007 | Cho | H04N 7/163 709/231 |
| 2008/0250144 A1* | 10/2008 | Choi | H04L 63/061 709/227 |
| 2009/0216351 A1* | 8/2009 | Van Horck | H04L 29/06027 700/94 |
| 2011/0181496 A1* | 7/2011 | Lanier | G06Q 20/102 345/2.2 |
| 2011/0295974 A1* | 12/2011 | Kashef | H04L 65/1073 709/217 |
| 2012/0050012 A1* | 3/2012 | Alsina | H04N 21/4126 340/10.1 |
| 2013/0152135 A1* | 6/2013 | Hong | H04N 21/4622 725/51 |
| 2013/0179928 A1* | 7/2013 | Nagata | H04N 21/4126 725/81 |
| 2014/0086549 A1* | 3/2014 | Davidson | H04N 21/47214 386/201 |
| 2014/0096166 A1 | 4/2014 | Gordon et al. | |
| 2014/0136978 A1* | 5/2014 | Verma | H04L 65/1083 715/716 |

FOREIGN PATENT DOCUMENTS

| | | | | |
|---|---|---|---|---|
| EP | 2523475 A1 * | 11/2012 | | H04L 65/1083 |
| WO | 2005/109829 A1 | 11/2005 | | |
| WO | WO 2005109829 A1 * | 11/2005 | | G06F 9/4856 |

OTHER PUBLICATIONS

Communication from the European Patent Office dated Feb. 8, 2016 in a counterpart European Application No. 15169752.1.
Communication from the European Patent Office dated Feb. 26, 2016 in a counterpart European Application No. 15169752.1.
Raja Bose, et al., "Terminal Mode—Transforming Mobile Devices into Automotive Application Platforms", AutomotiveUI 2010, Nov. 12, 2010, pp. 148-155, XP055083625.
Communication from the Partial European Patent Office dated Oct. 15, 2015 in a counterpart European Application No. 15169752.1.
International Search Report for PCT/KR2015/005279 dated Sep. 7, 2015 [PCT/ISA/210].
Communication dated Oct. 9, 2017 by the State Intellectual Property Office of P.R. China in counterpart Chinese Patent Application No. 201510284549.2.
Communication dated Oct. 25, 2017 by the European Patent Office in counterpart European Patent Application No. 15169752.1.
Communication dated Jun. 6, 2018, issued by the State Intellectual Property Office of the People's Republic of China in counterpart Chinese Patent Application No. 201510284549.2.
Communication dated Jan. 9, 2019, from the State Intellectual Property Office of People's Republic of China in counterpart Application No. 201510284549.2.

* cited by examiner

FIG. 7A
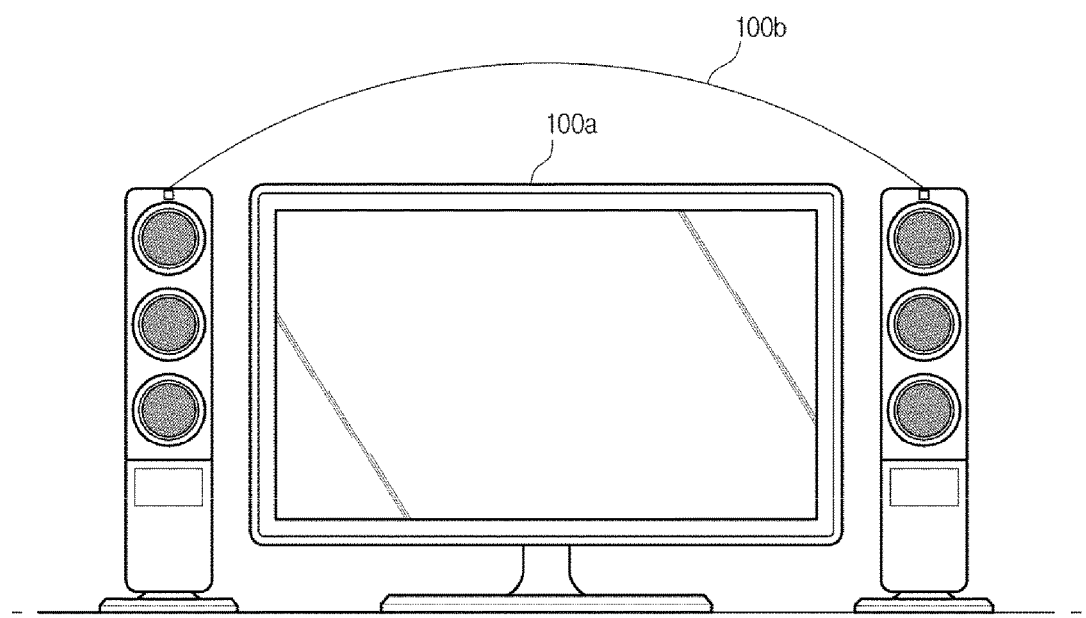
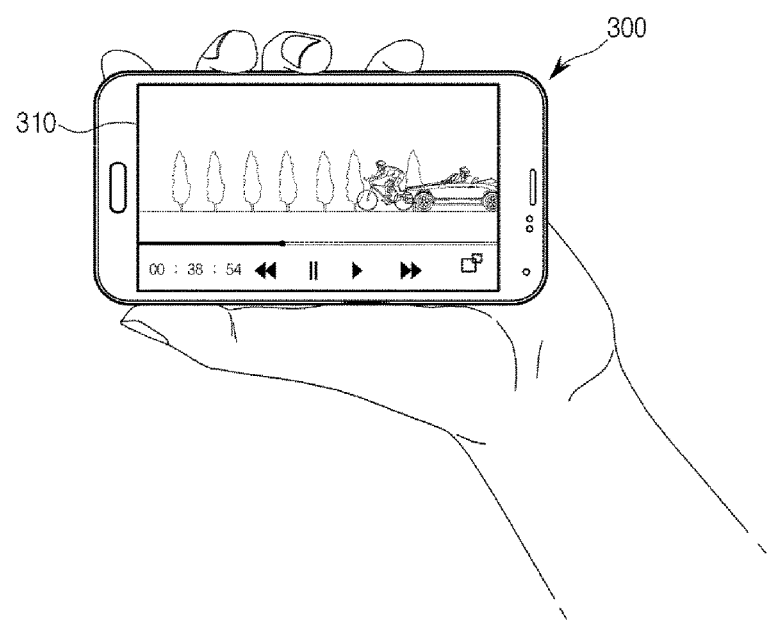

FIG. 7B
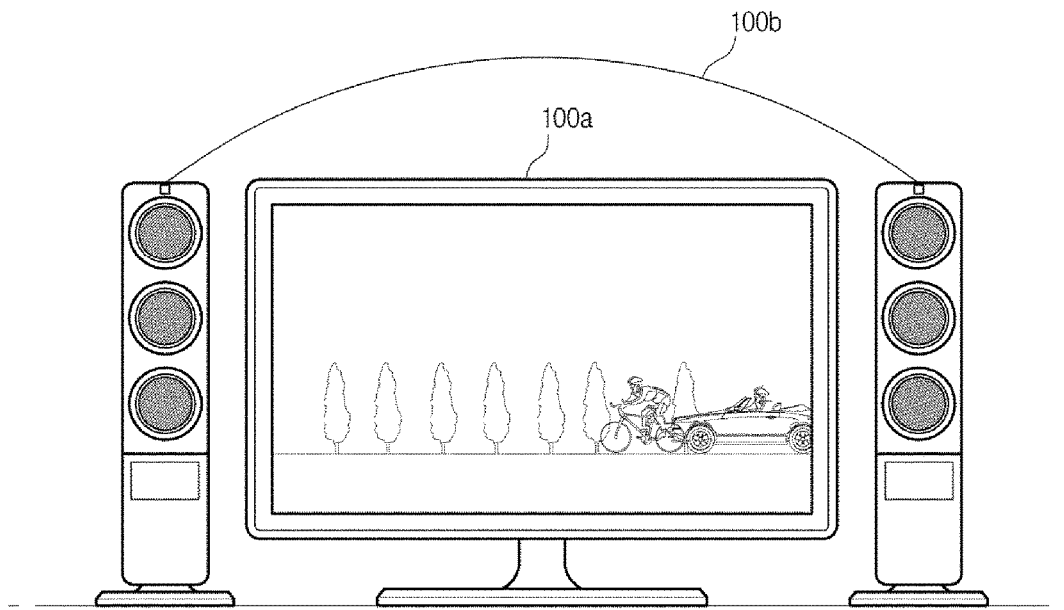
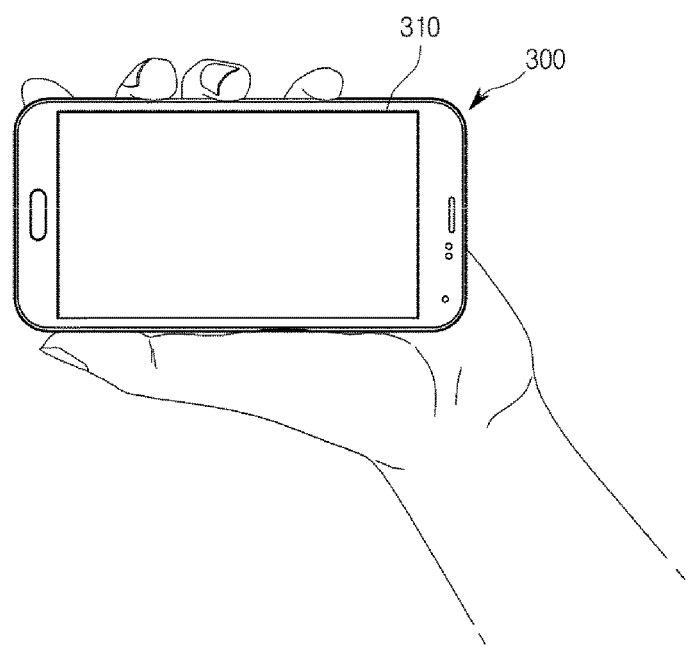

FIG. 8A
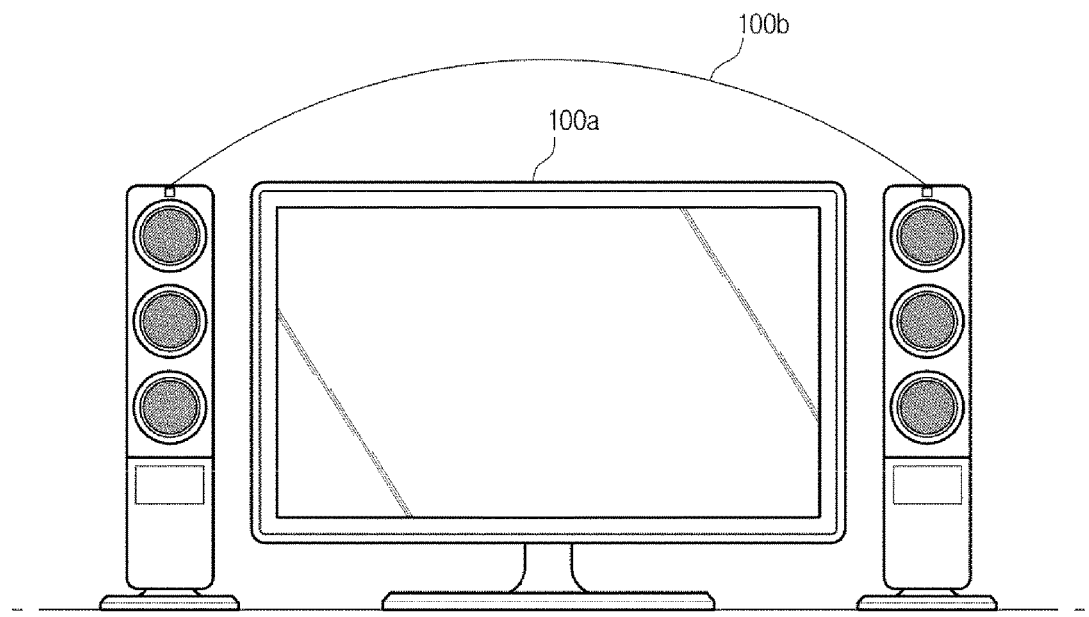
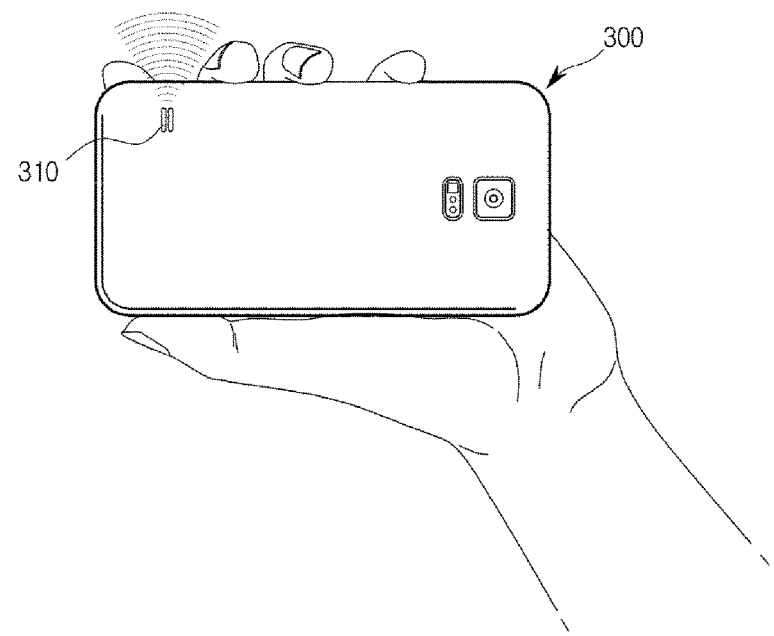

FIG. 8B
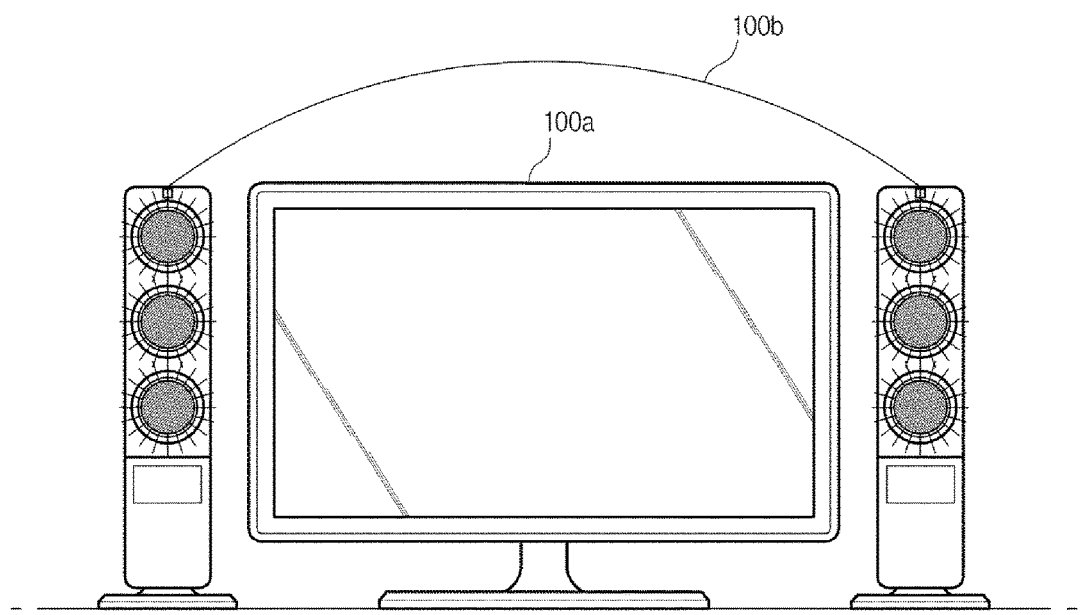
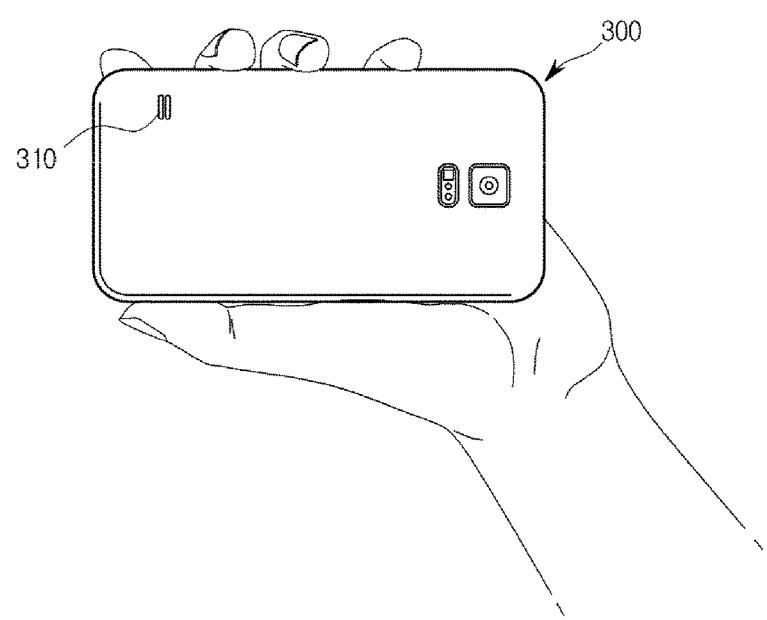

FIG. 9
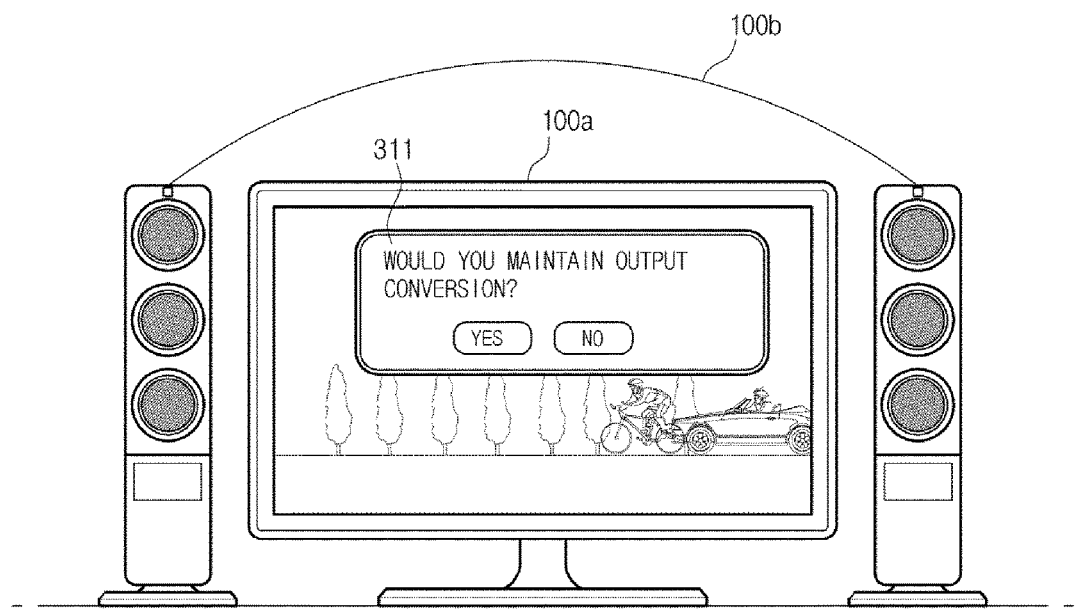
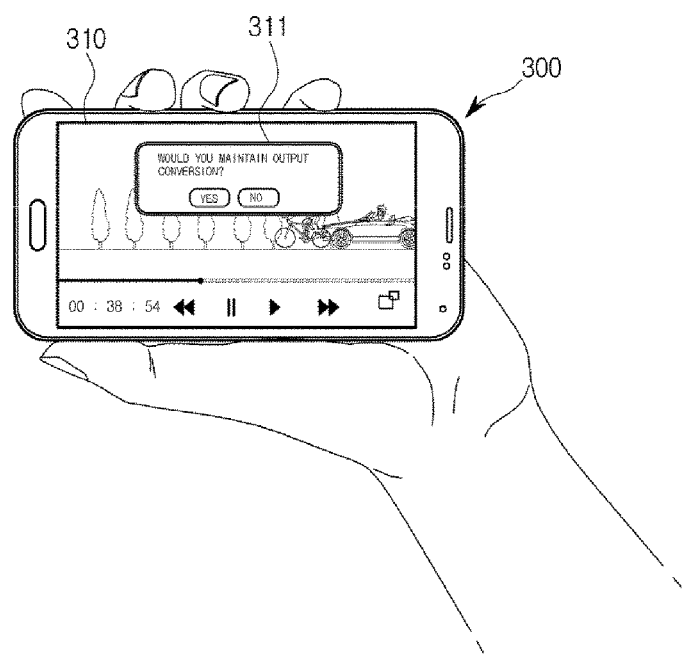

FIG. 11A
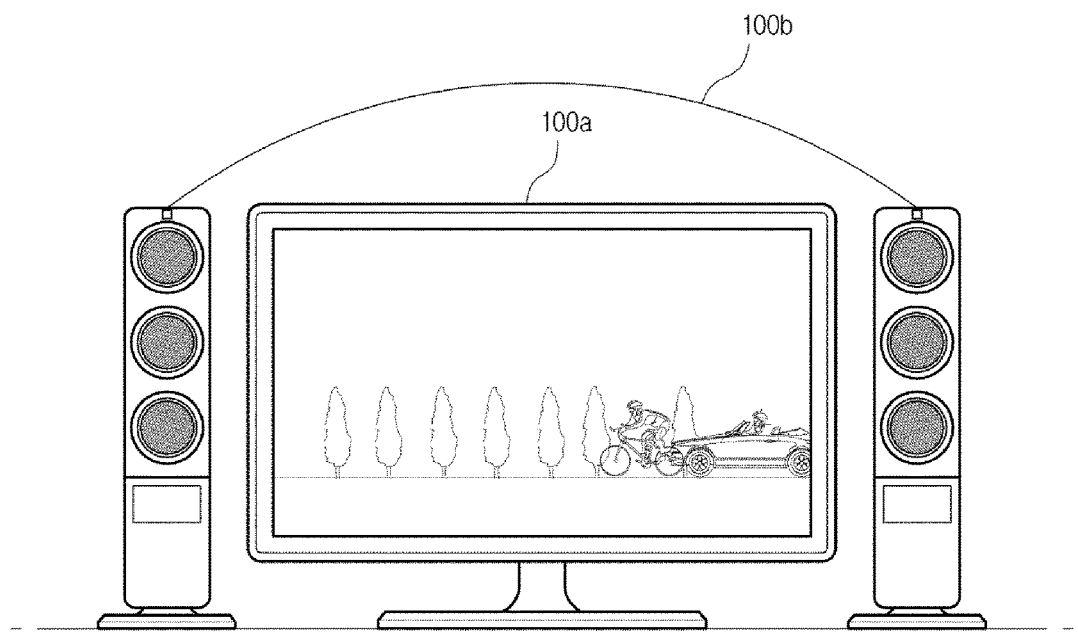

FIG. 12
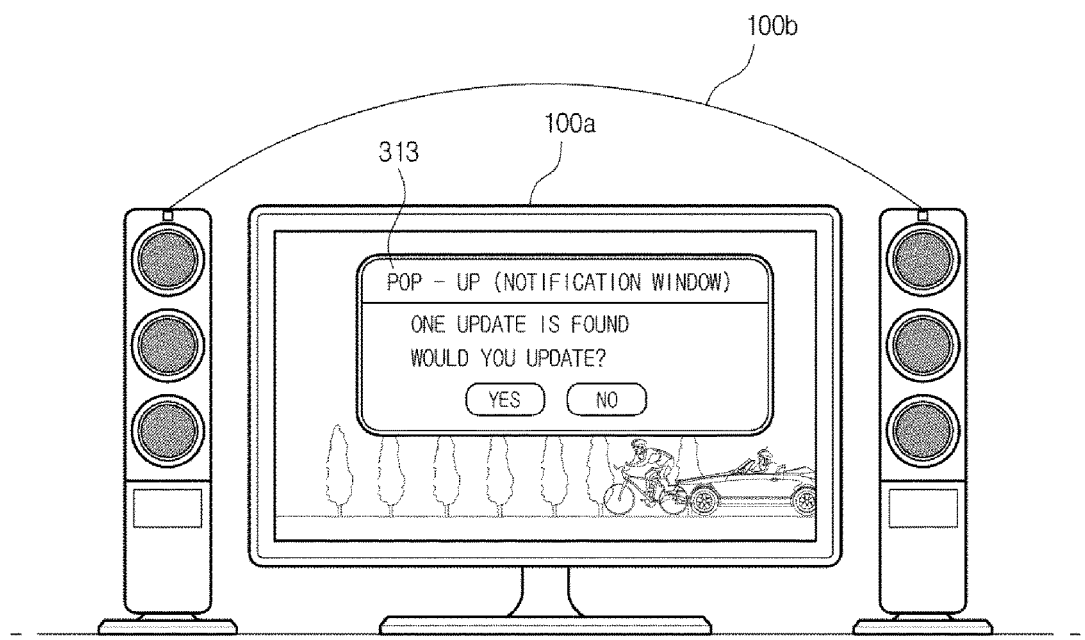
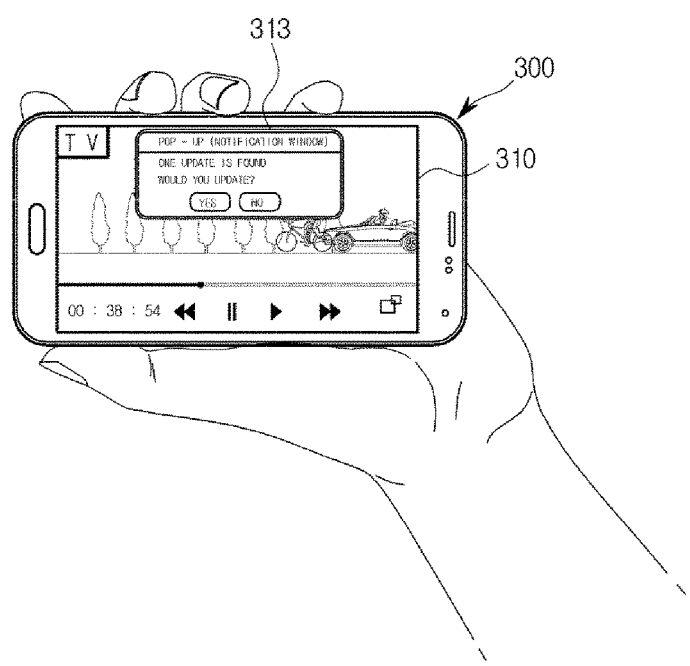

MOBILE APPARATUS, DISPLAY APPARATUS, AND MULTIMEDIA OUTPUT METHOD USING THE SAME

CROSS-REFERENCE TO RELATED APPLICATION

This application claims priority from Korean Patent Applications No. 10-2014-0064645, filed on May 28, 2014, and No. 10-2015-0000779, filed on Jan. 5, 2015, in the Korean Intellectual Property Office, the disclosures of which are incorporated herein by reference in their respective entireties.

BACKGROUND

1. Field

Exemplary embodiments relate to a mobile apparatus configured for outputting multimedia content, a display apparatus, and a multimedia output method using the same.

2. Description of the Related Art

Recently, the rapid development of wired/wireless data communication technologies and the extensive propagation of communication networks have led to the popularization of very high speed communication services such as the Internet. In particular, as the high-speed Internet has propagated at home, a typical PC-based network building technology has evolved to a home network technology for enabling a user to control home digital appliances at a remote place.

A home network system is a system which is configured to enable a user to control a desired appliance, regardless of time and place, by connecting digital appliances, sensors, lightings, cooling-heating equipment, and gas equipment, which are installed in home, to a short-range wired network or a wireless network.

The home network system may include a multimedia apparatus configured to output multimedia content. If a plurality of multimedia apparatuses are connected to each other through a home network, a user can receive multimedia content anywhere in home, which leads to improvement of accessibility to multimedia content.

SUMMARY

Therefore, it is an aspect of one or more exemplary embodiments to provide a mobile apparatus which is configured for enabling multimedia content which is being output on the mobile apparatus to be output via a predetermined multimedia apparatus when the mobile apparatus is connected to a home network, a display apparatus, and a multimedia output method using the same.

Additional aspects of the exemplary embodiments will be set forth in part in the description which follows and, in part, will be apparent from the description, or may be learned by practice of the exemplary embodiments.

In accordance with one aspect of one or more exemplary embodiments, a mobile apparatus for outputting first multimedia which includes at least one from among a picture, music, video, and text, includes: an output device configured to output the first multimedia content; and a controller configured to output, when the mobile apparatus enters a predetermined area, the first multimedia content via the predetermined external apparatus.

When the predetermined external apparatus is in a power-on state, the controller may be further configured to output the first multimedia content via the predetermined external apparatus when an input that relates to approving outputting of the first multimedia content via the predetermined external apparatus is received.

When the predetermined external apparatus is in a power-off state, the controller may be further configured to power on the predetermined external apparatus.

When the predetermined external apparatus is powered on, the controller may be further configured to output the first multimedia content via the predetermined external apparatus.

The controller may be further configured to output second multimedia content which is synchronized with the first multimedia content via the predetermined external apparatus.

When the mobile apparatus enters the predetermined area within a predetermined time period, the controller may be further configured to output the first multimedia content via the predetermined external apparatus.

When a plurality of external apparatuses are available, the controller may be further configured to determine an external apparatus via which the first multimedia content is to be output, based on at least one predetermined criterion.

The controller may be further configured to determine whether each external apparatus is in a power-off state based on the at least one predetermined criterion, and to determine an external apparatus in a power-off state as an external apparatus via which the first multimedia content is to be output.

The mobile apparatus may further include a transceiver configured to transmit data that relates to the first multimedia content to the predetermined external apparatus under the control of the controller.

If the first multimedia content is stored in the mobile apparatus, the controller may be further configured to control the transceiver to transmit streaming data that relates to the first multimedia content to the predetermined external apparatus.

If the first multimedia content is output in a streaming mode, the controller may be further configured to control the transceiver to transmit a Uniform Resource Locator (URL) that relates to the first multimedia content to the predetermined external apparatus.

If the multimedia is output based on a Digital Multimedia Broadcasting (DMB) signal, the controller may be further configured to control the transceiver to transmit channel information that relates to the first multimedia content to the predetermined external apparatus.

When the mobile apparatus enters the predetermined area, the controller may be further configured to notify that the mobile apparatus enters the predetermined area via the predetermined external apparatus.

The output device may be further configured to output a notification event which relates to a setting of the predetermined external apparatus, and the controller may be further configured to control the predetermined external apparatus based on an input that is received in response to the notification event.

The output device may be further configured to output a notification event inquiring whether to continue to output the first multimedia content to the predetermined external apparatus.

The mobile apparatus may further include a transceiver configured to transmit a signal which relates to powering on the predetermined external apparatus to the predetermined external apparatus, wherein the transceiver may be further configured to transmit the signal by using at least one from among Wake on Lan (WoL), Wake on Wireless Lan (WoWLAN), and Bluetooth.

The transceiver may be further configured to transmit data that relates to the first multimedia content to the predetermined external apparatus by using at least one from among Wireless Fidelity (WiFi) and Bluetooth.

In accordance with another aspect of one or more exemplary embodiments, a display apparatus for outputting multimedia content which includes at least one from among a picture, music, video, and text, includes: an output device configured to output, if a predetermined mobile apparatus enters a predetermined area, multimedia content being output on the predetermined mobile apparatus.

When the display apparatus is in a power-on state, the output device may be further configured to output a notification event inquiring whether to output the multimedia content being output on the predetermined mobile apparatus.

When the display apparatus is in a power-off state, the output device may be further configured to output the multimedia content if the display apparatus is powered on by the predetermined mobile apparatus.

If the predetermined mobile apparatus enters the predetermined area within a predetermined time period, the output device may be further configured to output the multimedia content.

The display apparatus may further include a transceiver configured to receive data that relates to the multimedia content from the predetermined mobile apparatus.

If the multimedia content is stored in the predetermined mobile apparatus, the transceiver may be further configured to receive streaming data that relates to the multimedia content from the predetermined mobile apparatus.

If the multimedia content is output on the predetermined mobile apparatus in a streaming mode, the transceiver may be further configured to receive a Uniform Resource Locator (URL) address that relates to the multimedia from the predetermined mobile apparatus.

If the multimedia content is output based on a Digital Multimedia Broadcasting (DMB) signal, the transceiver may be further configured to receive channel information that relates to the multimedia content from the predetermined mobile apparatus.

If the predetermined mobile apparatus enters the predetermined area, the output device may be further configured to notify that the predetermined mobile apparatus enters the predetermined area.

The display apparatus may further include a controller configured to output, if the output device outputs a notification event that relates to a setting of the display apparatus, the notification event via the predetermined mobile apparatus.

The output device may be further configured to output a notification event inquiring whether to continue to output the multimedia content via the output device.

The display apparatus may further include a transceiver configured to receive a signal that relates to powering on the display apparatus from the predetermined mobile apparatus, wherein the transceiver may receive the signal by using at least one from among Wake on Lan (WoL), Wake on Wireless Lan (WoWLAN), and Bluetooth.

The transceiver may be further configured to receive data that relates to the multimedia content from the predetermined mobile apparatus by using at least one from among Wireless Fidelity (WiFi) and Bluetooth.

In accordance with another aspect of one or more exemplary embodiments, a method for outputting multimedia content which includes at least one from among a picture, music, video, and text, includes: at a mobile apparatus, outputting first multimedia content; and if the mobile apparatus enters a predetermined area, outputting the first multimedia content being output on the mobile apparatus via a predetermined external apparatus.

The outputting of the first multimedia content being output on the mobile apparatus via the predetermined external apparatus may include: if the predetermined external apparatus is in a power-on state, receiving an input that relates to approving outputting of the first multimedia content being output on the mobile apparatus via the predetermined external apparatus; and if the input is received, outputting the first multimedia content via the predetermined external apparatus.

The outputting of the first multimedia content being output on the mobile apparatus via the predetermined external apparatus may include: if the predetermined external apparatus is in a power-off state, powering on the predetermined external apparatus; and if the predetermined external apparatus is powered on, outputting the first multimedia content being output on the output unit via the external apparatus.

The outputting of the first multimedia content being output on the mobile apparatus via the predetermined external apparatus may include outputting second multimedia content which is synchronized with the first multimedia content via the predetermined external apparatus.

The outputting of the first multimedia content being output on the mobile apparatus via the predetermined external apparatus may include if the mobile apparatus enters the predetermined area within a predetermined time period, outputting the first multimedia content via the predetermined external apparatus.

The outputting of the first multimedia content being output on the mobile apparatus via the predetermined external apparatus may include: if a plurality of external apparatuses are available, determining whether each of the plurality of external apparatuses is in a power-off state based on at least one predetermined priority; and if the predetermined external apparatus is in the power-off state, powering on the predetermined external apparatus; and outputting the first multimedia content via the powered-on predetermined external apparatus.

The outputting of the first multimedia content being output on the mobile apparatus via the predetermined external apparatus may include if the first multimedia content is stored in the mobile apparatus, transmitting streaming data that relates to the first multimedia content to the predetermined external apparatus.

The outputting of the first multimedia content being output on the mobile apparatus via the predetermined external apparatus may include if the mobile apparatus outputs the first multimedia content in a streaming mode, transmitting a Uniform Resource Locator (URL) that relates to the first multimedia content to the predetermined external apparatus.

The outputting of the first multimedia content being output on the mobile apparatus via the predetermined external apparatus may include if the mobile apparatus outputs the first multimedia content based on a Digital Multimedia Broadcasting (DMB) signal, transmitting channel information that relates to the first multimedia content to the predetermined external apparatus.

The method may further include if the mobile apparatus enters the predetermined area, notifying that the mobile apparatus enters the predetermined area via the predetermined external apparatus.

The method may further include: if the predetermined external apparatus outputs a notification event that relates to a setting, at the mobile apparatus, outputting the notification event; and if the mobile apparatus receives an input that is responsive to the notification event, changing a setting of the predetermined external apparatus based on the received input.

The method may further include using at least one from among the mobile apparatus and the predetermined external apparatus to output a notification event inquiring whether to continue to output the first multimedia content via the predetermined external apparatus.

BRIEF DESCRIPTION OF THE DRAWINGS

These and/or other aspects will become apparent and more readily appreciated from the following description of exemplary embodiments, taken in conjunction with the accompanying drawings of which:

FIGS. 7A and 7B are views for describing an output conversion method, according to an exemplary embodiment;

FIGS. 8A and 8B are views for describing an output conversion method, according to another exemplary embodiment;

FIG. 9 is a view for describing an exemplary embodiment of a method for outputting a notification event inquiring whether to maintain output conversion in a mobile apparatus, according to an exemplary embodiment;

FIGS. 11A and 11B are views for describing an exemplary embodiment of a method for displaying a network connection state in a mobile apparatus, according to an exemplary embodiment;

FIG. 12 is a view for describing an exemplary embodiment of a method for outputting an external apparatus setting event in an mobile apparatus, according to an exemplary embodiment;

DETAILED DESCRIPTION

Hereinafter, a mobile apparatus, a display apparatus, and a multimedia output method will be described in detail with reference to the accompanying drawings.

In the following description, "multimedia" refers to a complex of digitalized characters, sound, and images, and may include at least one from among a picture, music, video, and text.

Figure 1:
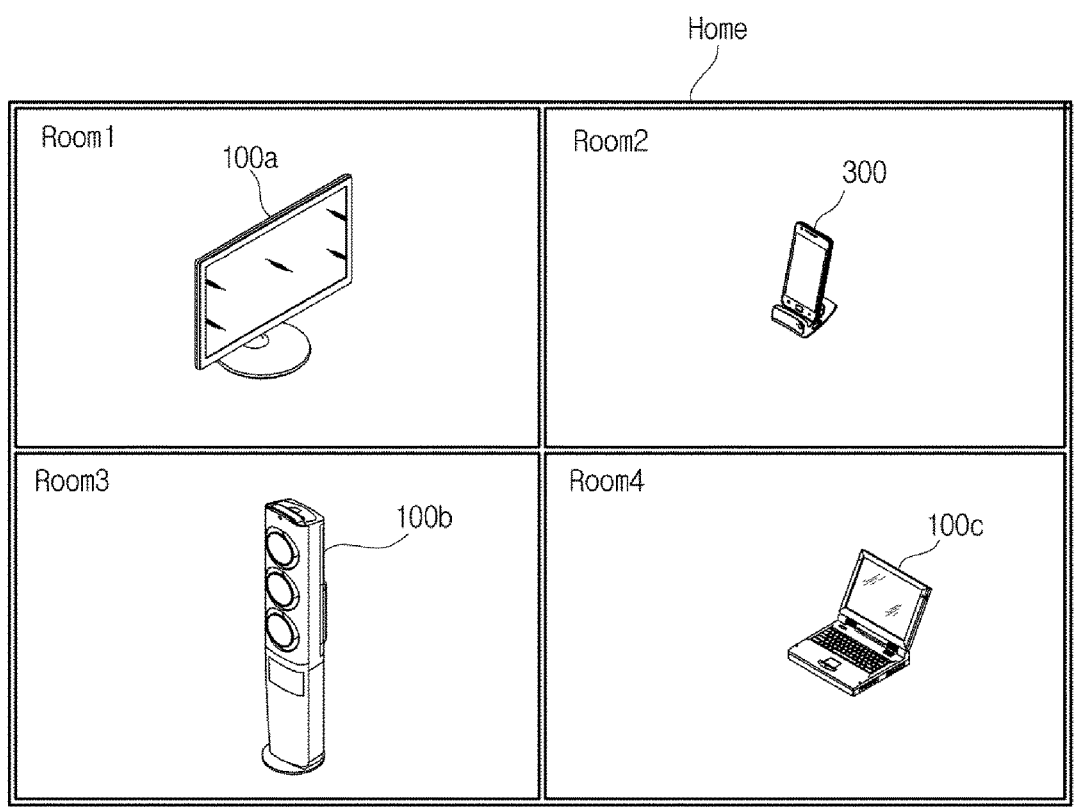
FIG. 1 shows an example of a multimedia system, according to an exemplary embodiment.
Figure 2:
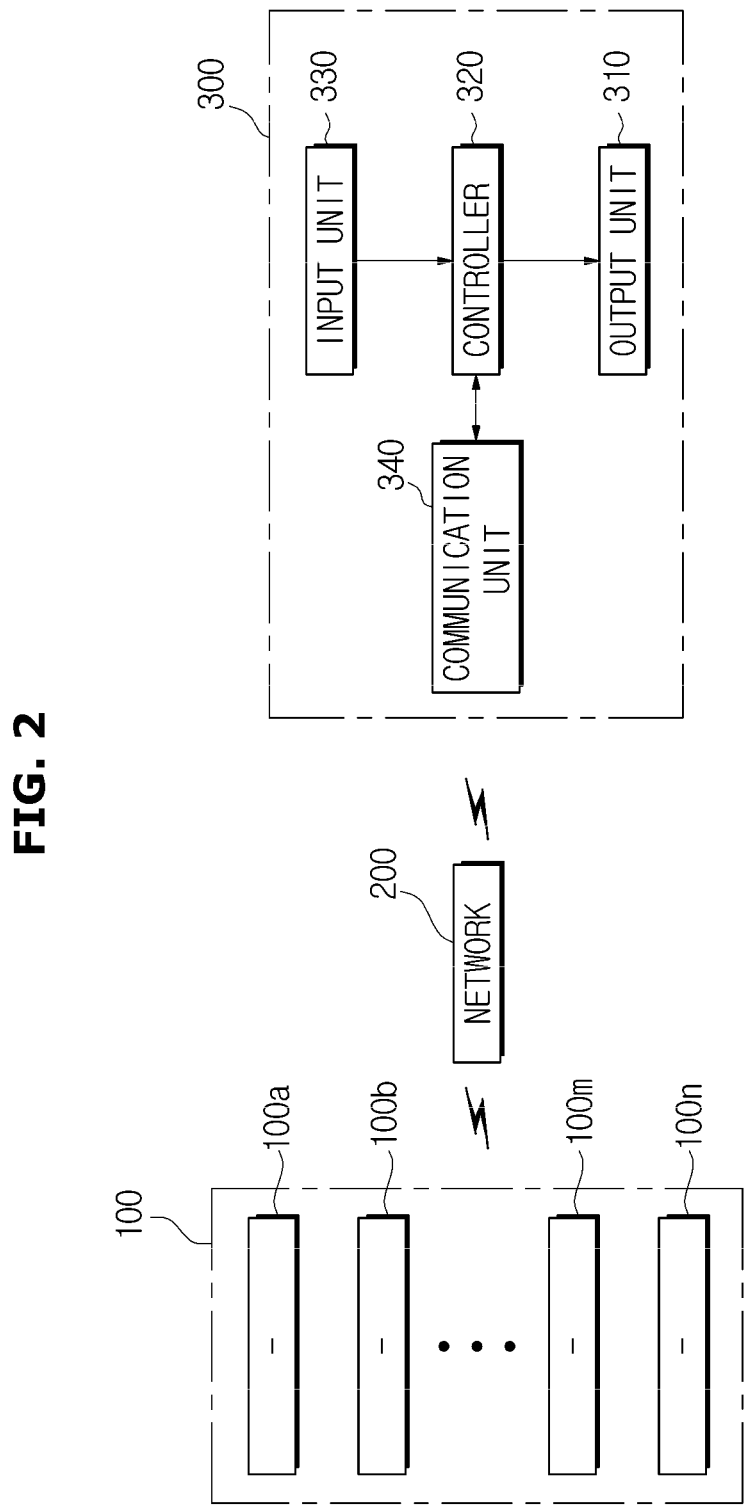
FIG. 2 is a block diagram of a mobile apparatus, according to an exemplary embodiment, which is a component of the multimedia system of FIG. 1.

FIG. 1 shows an example of a multimedia system according to an exemplary embodiment, and FIG. 2 is a block diagram of a mobile apparatus according to an exemplary embodiment, which is a component of the multimedia system of FIG. 1.

Referring to FIGS. 1 and 2, the multimedia system may include: a mobile apparatus 300 configured to output multimedia content; a plurality of external apparatuses 100 that can output multimedia content being output on the mobile apparatus 300; and a network 200 to connect the external apparatuses 100 to the mobile apparatus 300.

The external apparatuses 100 can output predetermined multimedia content. The external apparatuses 100 may include a display apparatus 100a configured to output pictures or video, and an acoustic apparatus 100b configured to output music. In addition, the external apparatuses 100 may include a computer 100c configured to output various kinds of multimedia content.

Further, the external apparatuses 100 may include an apparatus having a multimedia output function as its additional function. For example, if a refrigerator having a cooling function as its main function includes a display panel for outputting multimedia, such a refrigerator may be included in the external apparatuses 100.

The external apparatuses 100 may include an apparatus which is installed in home and inconvenient to carry about, may further include a terminal, such as a personal computer (PC), a laptop computer, or a tablet PC, which is used in home, and may further include security equipment with a camera and a microphone.

The network 200 may enable all the external apparatuses 100 used in home to connect to one system for two-way communication.

More specifically, the network 200 may enable the external apparatuses 100 to share information via the wired/wireless Internet.

In-home data transmission methods may be classified into wired methods and wireless methods, wherein the wired methods include Home Phoneline Networking Alliance (HPNA) using a typical phone line, IEEE 1394, a power line, and the like, and the wireless methods include Home Radio Frequency (HRF), Bluetooth, Infrared Data Association (IrDA), Wireless Local Area Network (WLAN, e.g., Wireless Fidelity (WiFi)), Zigbee, Z-wave, Near Field Communication (NFC), and the like.

In the following description, for convenience of description, a data transmission method of the network 200 is assumed to be WiFi.

The mobile apparatus 300 may be connected to the network 200 in order to communicate with at least one of the plurality of external apparatuses 100. Further, the mobile apparatus 300 may communicate with the plurality of external apparatuses 100 in home, and may communicate with a home server to transmit/receive information to/from the plurality of external apparatus 100.

The mobile apparatus 300 may be a terminal that can move freely in or out of the home to easily connect/disconnect to/from the network 200, and that can output multimedia content. For example, the mobile apparatus 300 may include nay of a smart phone, Personal Data Assistant (PDA), and/or a tablet PC.

Further, the mobile apparatus 300 may include a terminal in which applications provided by a contents provider can be installed, and/or an apparatus in which applications, software, or firmware has been installed by a manufacturing company upon manufacturing.

As shown in FIG. 2, the mobile apparatus 300 may include an output unit (also referred to herein as an "output device") 310, a controller 320, an input unit (also referred to herein as an "input device") 330, and a communication unit (also referred to herein as a "communicator" and/or as a "transceiver") 340.

The input unit 330 may receive an input for controlling the output of multimedia content from a user, and the output unit 310 may output multimedia content according to the input from the user. The input unit 330 and the output unit 310 may be implemented as a component, such as a touch screen, which can perform both an input function and an output function, or the input unit 330 and the output unit 310 may be implemented as separate components. In addition, there may be provided any or all of a component having both an input function and an output function, a component having only an input function, and a component having only an output function.

The output unit 310 may include a sound output device configured to output sound, and an image output device configured to output text and/or images. Since multimedia can include at least one of a picture, music, video, and text, sound components of music and video may be output via the sound output device, and image components of a picture, text, and video may be output via the image output device.

Meanwhile, there is a case in which a user wants to receive multimedia content being output on the mobile apparatus 300 via a multimedia apparatus in a home. In this case, the user needs to input a command for transmitting data that relates to the multimedia content of the mobile apparatus 300 to a desired external apparatus 100 in the home.

However, when the user applies an input for converting the output of multimedia content, the multimedia may be discontinuously output. Particularly, when the mobile apparatus 300 outputs real-time images to the user, no real-time images may be provided to the user during a time period for which the user applies an input for outputting real-time images via the external apparatus 100 in the home.

Accordingly, a setting for automatically outputting multimedia content being output on the mobile apparatus 300 via the external apparatus 100 according to a predetermined condition is needed.

The output unit 310 may output a multimedia output setting screen, and the input unit 330 may receive a multimedia output setting input.

Figure 3:
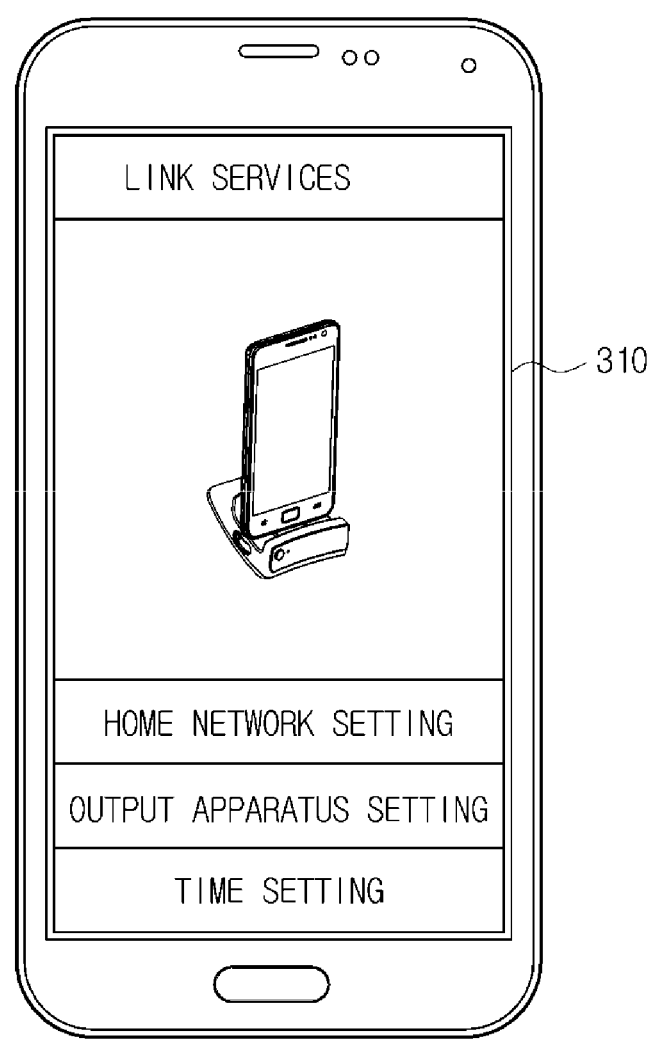
FIG. 3 shows an example of a multimedia output setting window that is output via an output unit of a mobile apparatus, according to an exemplary embodiment.

FIG. 3 shows an example of a multimedia output setting window that is output via the output unit 310 of the mobile apparatus 300, according to an exemplary embodiment.

A multimedia output setting window that is output via the output unit 310 may include one or more setting items, such as a home network setting item, an output apparatus setting item, and/or a time setting item. In FIG. 3, three setting items are shown, however, the number of setting items is not limited.

The home network setting item is an item for setting the network 200 in which output conversion of multimedia content is performed to a home network. Herein, the home network may be a network to which the external apparatus 100 via which a user wants to output multimedia content, from among the external apparatuses 100 installed in home, and is connected to perform data transmission/reception.

If the input unit 330 receives an input for selecting the home network setting item from a user, the output unit 310 may display a home network setting window.

Figure 4:
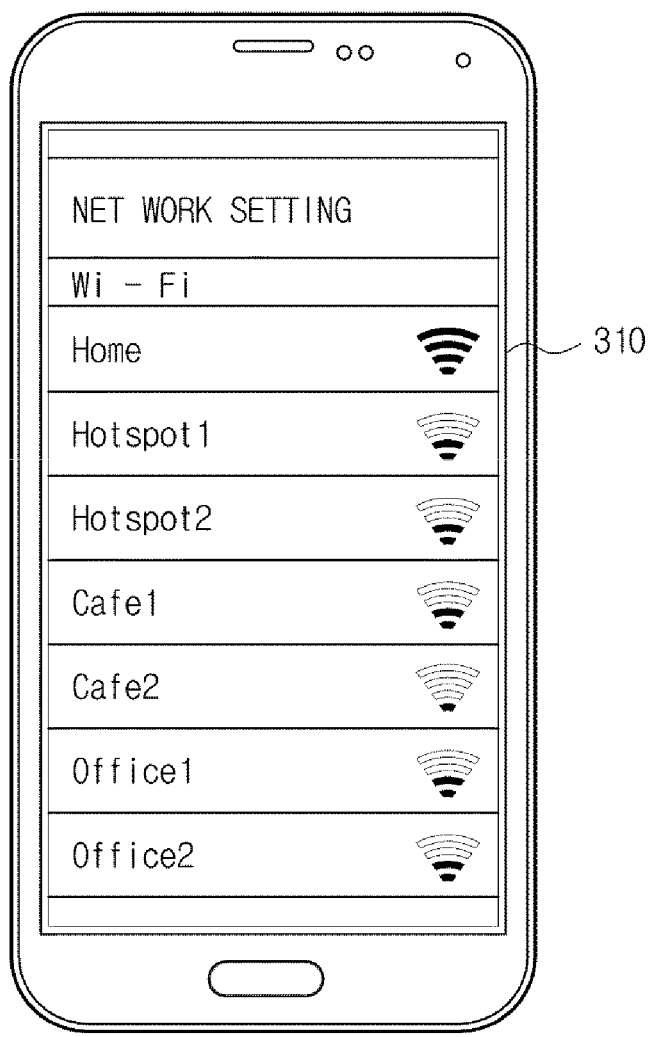
FIG. 4 shows an example of a home network setting window that is output via an output unit of a mobile apparatus, according to an exemplary embodiment.

FIG. 4 shows an example of a home network setting window that is output via the output unit 310 of the mobile apparatus 300, according to an exemplary embodiment.

The mobile apparatus 300 may search for one or more networks to which the mobile apparatus 300 can be connected, and display information about the found networks via the output unit 310. The user may select at least one network from among the networks displayed on the output unit 310, and set the selected network to a home network.

However, the user may input information about a network which he/she wants to set to a home network, and set the network to a home network.

If the input unit 330 receives a home network setting input from the user, the network input by the user may be set to a home network. Then, if the mobile apparatus 300 is connected to the home network, the output of multimedia content may be automatically converted.

Referring again to FIG. 3, the output apparatus setting item is an item for setting an external apparatus via which a user wants to output multimedia content according to a kind of the multimedia content.

If the input unit 330 receives an input for selecting the output apparatus setting item from the user, the output unit 310 may display an output apparatus setting window.

Figure 5A:
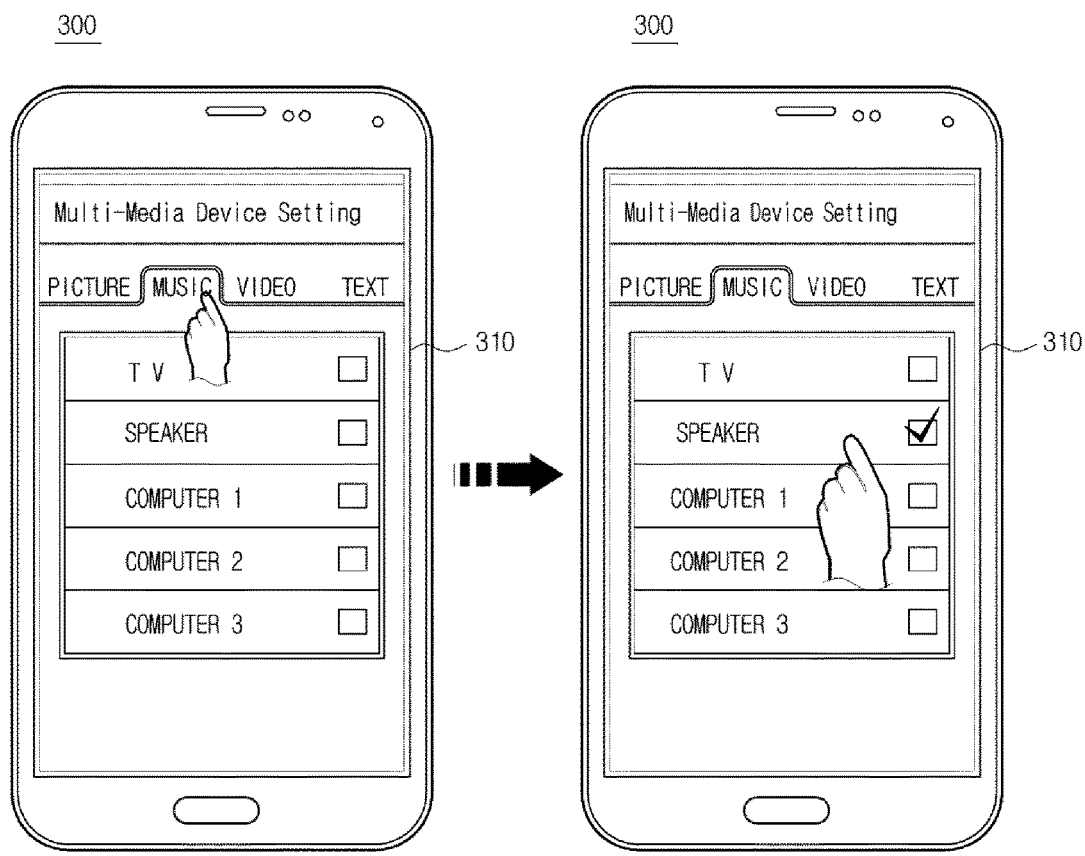
FIGS. 5A and 5B are views for describing an output apparatus setting method that is performed by a mobile apparatus, according to an exemplary embodiment.
Figure 5B:
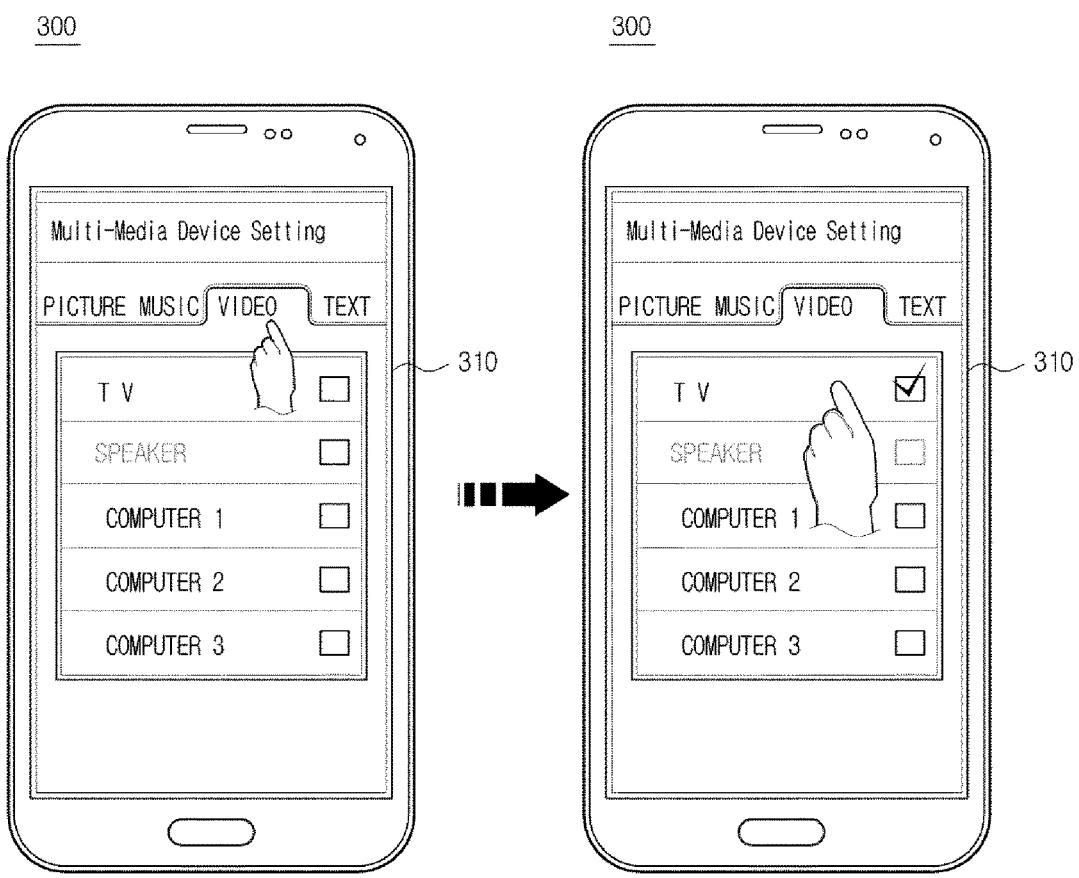

FIGS. 5A and 5B are views for describing an output apparatus setting method that is performed by the mobile apparatus 300, according to an exemplary embodiment.

An output apparatus may be set according to a kind of multimedia content. Accordingly, the output apparatus setting window may include a plurality of tabs in order to enable a user to select a kind of multimedia content. As shown in the left part of FIG. 5A, if the input unit 330 receives an input for selecting a music tab from the user, the output unit 310 may display information about one or more external apparatuses that can be set to an output apparatus. As shown in the left part of FIG. 5A, a TV 100a, a speaker 100b, a computer 1, a computer 2, and a computer 3 may be displayed as external apparatuses that can be set to output music.

Herein, the external apparatuses that can be set to an output apparatus may include external apparatuses that can output the selected multimedia content, among the external apparatuses that can be connected to the home network to perform data transmission/reception with the mobile apparatus 300.

The user may select a desired external apparatus from among the external apparatuses that can be set to an output apparatus. For example, referring to the right part of FIG. 5A, the input unit 330 may receive an input for selecting the speaker 100b from the user. Then, when the mobile apparatus 300 connects to the home network while outputting music, the music may be output via the speaker 100b.

Also, as shown in the left part of FIG. 5B, if the input unit 330 receives an input for selecting a video tab from the user, the output unit 310 may display information about one or more external apparatuses that can be set to an output apparatus. As shown in the left part of FIG. 5B, a TV 100a, a speaker 100b, a computer 1, a computer 2, and a computer 3 may be displayed as external apparatuses that can be set to output video. In this case, unlike the example of FIG. 5A, the speaker 100b that cannot output video may be deactivated.

Referring to the right part of FIG. 5A, the input unit 330 may receive an input for selecting the TV 100a from the user. Then, when the mobile apparatus 300 connects to the home network while outputting video, the video may be output via the TV 100a.

In FIGS. 5A and 5B, cases in which a user selects an external apparatus 100 in regard of a kind of multimedia content are shown, however, a user may select a plurality of external apparatuses in regard of a kind of multimedia content. Further, a user may allocate one or more priorities to a plurality of external apparatuses in regard of a kind of multimedia content in selecting one or more external apparatuses. This will be described below.

Referring again to FIG. 3, the time setting item is an item for setting a time period during which output conversion is performed.

If the input unit 330 receives an input for selecting the time setting item from the user, the output unit 310 may display a time setting window.

Figure 6:
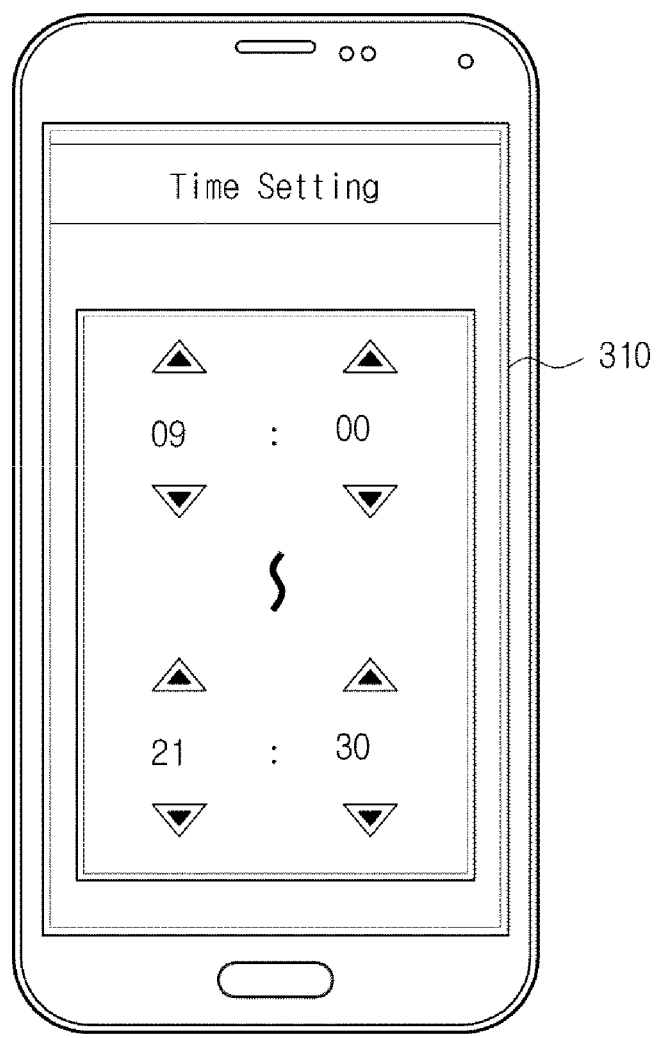
FIG. 6 shows an example of a time setting window that is output via an output unit of a mobile apparatus, according to an exemplary embodiment.

FIG. 6 shows an example of a time setting window that is output via the output unit 310 of the mobile apparatus 300, according to an exemplary embodiment.

As shown in FIG. 6, a time setting window to enable a user to set a start time and an end time may be displayed on the output unit 310. If the input unit 330 receives an input for selecting a start time and an end time from the user, automatic conversion of output may be performed for a time period set by the input. Except for the time period, no automatic conversion of output may be performed.

As described above with reference to FIGS. 3 to 6, a user may complete output settings of multimedia via the input unit 330 and the output unit 310. According to the output settings, the mobile apparatus 300 may perform output conversion automatically.

Referring again to FIG. 2, the controller 320 may output, when the mobile apparatus 300 enters the home, multimedia content being output on the output unit 310 of the mobile apparatus 300 through a predetermined external apparatus 100.

FIGS. 7A and 7B are views for describing an exemplary embodiment of an output conversion method, according to an exemplary embodiment. For convenience of description, a home area is assumed to be an area in which the mobile apparatus 300 can connect to WiFi via an Access Point (AP). Also, it is assumed that video has been set to correspond to a TV 100a, as shown in FIG. 5B.

Referring to FIG. 7A, the output unit 310 of the mobile apparatus 300 may output video. A user can watch video provided via the mobile apparatus 300 regardless of time and place. When the user enters the home while watching video through the mobile apparatus 300, the user may want to watch the video in a more comfortable environment. In this case, it is necessary to output video being output on the output unit 310 of the mobile apparatus 300 via a predetermined external apparatus 100.

If a home network setting, an output apparatus setting, and/or a time setting has been completed before the user enters the home, the controller 320 may control the mobile apparatus 300 to perform the output conversion of video.

First, the controller 320 may determine whether the mobile apparatus 300 has connected to a home network. Since the mobile apparatus 300 has entered the home, the controller 320 may determine that the mobile apparatus 300 has connected to the home network.

If the controller 320 determines that the mobile apparatus 300 has connected to the home network, the controller 320 may search for an external apparatus 100 corresponding to a kind of multimedia content being output on the output unit 310. The external apparatus 100 corresponding to the kind of multimedia content being output on the output unit 310 may be an external apparatus set to correspond to the kind of multimedia content when an output apparatus is set. In FIG. 7B, since video has been set to correspond to the TV 100a as shown in FIG. 5B, the controller 320 may determine output conversion to the TV 100a.

At this time, the controller 320 may check a power on/off state of the determined external apparatus 100. If the controller 320 determines that the external apparatus 100 is in a power-off state, the controller 320 may power on the external apparatus 100. In order to power on the external apparatus 100, the controller 320 may apply a power-on signal to the external apparatus 100.

According to an exemplary embodiment, the controller 320 may apply power to the external apparatus 100 by using Wake on Lan (WoL) or Wake on Wireless Lan (WoWLAN). More specifically, if the controller 320 generates a power-on signal, the communication unit 340 may transmit the power-on signal to the external apparatus 100 by using a wired/wireless LAN method. The external apparatus 100 may be powered on according to the power-on signal.

According to another exemplary embodiment, the controller 320 may apply power to the external apparatus 100 by using Bluetooth. More specifically, if the controller 320 generates a power-on signal, the communication unit 340 may transmit the power-on signal to the external apparatus 100 by using a Bluetooth method. Then, the external apparatus 100 may be powered on according to the power-on signal. If the external apparatus 100 is powered on, the controller 320 can output multimedia content via the external apparatus 100. If the external apparatus 100 is in the power-off state, the controller 320 may determine that the external apparatus 100 is not used, power on the external apparatus 100, and then output multimedia content via the external apparatus 100.

Meanwhile, there is a case in which the external apparatus 100 is in a power-on state and is outputting multimedia content. The case will be described below.

Finally, the controller 320 may enable multimedia content being output on the output unit 310 to be output via the external apparatus 100. In particular, video being output on the mobile apparatus 300 may be output via the TV 100*a*, as shown in FIG. 7B.

In FIG. 7B, a case in which video being output on the mobile apparatus 300 is output via the TV 100*a*, and the mobile apparatus 300 stops outputting video is shown. However, both the mobile apparatus 300 and the TV 100*a* may output video.

The controller 320 may output multimedia content via the external apparatus 100 in synchronization with multimedia content being output on the mobile apparatus 300. For example, if the mobile apparatus 300 is outputting video, the controller 320 may synchronize the video such that a part of the video being output on the mobile apparatus 300 is output via the TV 100*a* at a time when output conversion to the TV 100*a* occurs. Thereby, the user can receive multimedia content without any interruption or loss.

FIGS. 8A and 8B are views for describing an output conversion method, according to another exemplary embodiment. For convenience of description, a home area is assumed to be an area in which the mobile apparatus 300 can connect to WiFi via an AP.

Unlike the exemplary embodiment of FIGS. 7A and 7B, multimedia content being output on the mobile apparatus 300 when a user enters a home may be music. Also, it is assumed that a setting has been completed as shown in FIG. 5B before the user enters the home.

In FIG. 8A, a case in which when the mobile apparatus 300 enters the home, that is, when the mobile apparatus 300 connects to a home network, the mobile apparatus 300 is outputting music is shown. In order to provide music to the user in a more comfortable environment, the controller 320 may convert an apparatus of outputting music according to a predetermined condition.

First, the controller 320 may determine that when multimedia content being output on the mobile apparatus 300 is music, an apparatus to which output conversion is to be performed is a speaker 100*b*. Then, the controller 320 may output music being output via the output unit 310 of the mobile apparatus 300 via the speaker 100*b*.

As shown in FIG. 8B, music synchronized with the music output via the mobile apparatus 300 may be output via the speaker 100*b*. At this time, the output unit 310 of the mobile apparatus 300 may stop outputting music, or may continue to output music together with the speaker 100*b*.

Referring again to FIG. 2, in order to output multimedia content being output on the mobile apparatus 300 via the external apparatus 100, the communication unit 340 may transmit data about the multimedia content to the external apparatus 100 under the control of the controller 320.

Herein, the data about the multimedia content may include all data to enable the external apparatus 100 to output multimedia content.

For example, if multimedia content has been stored in the form of a compressed file in the mobile apparatus 300, the communication unit 340 may transmit streaming data of the multimedia content to the external apparatus 100. Accordingly, the external apparatus 100 may output the multimedia content in a streaming mode.

However, if multimedia content is being output in a streaming mode on the mobile apparatus 300, the communication unit 340 may transmit a Uniform Resource Locator (URL) address of the multimedia content to the external apparatus 100. Then, the external apparatus 100 may receive streaming data of the multimedia content from the URL address, not from the mobile apparatus 300, and output the multimedia content.

Further, if the mobile apparatus 300 receives Digital Multimedia Broadcasting (DMB) signals, and outputs multimedia content based on the DMB signals, the communication unit 340 may transmit channel information of the multimedia content to the external apparatus 100. Then, the external apparatus 100 may receive only the channel information from the mobile apparatus 300, and receive broadcasting signals about the corresponding channel information from a separate receiver, etc. in order to output the multimedia content.

In addition, after output conversion is completed, the controller 320 may output a notification event inquiring whether to continue to output multimedia via the external apparatus 100.

FIG. 9 is a view for describing a method for outputting a notification event inquiring whether to maintain output conversion in the mobile apparatus 300, according to an exemplary embodiment. In FIG. 9, a case in which output conversion with respect to video being output on the mobile apparatus 300 is performed between the mobile apparatus 300 and the TV 100*a* is shown.

After output conversion is performed according to a predetermined setting, a user may determine that the output conversion is no longer needed. In this case, the controller 320 may control the output unit 310 to output an event for canceling output conversion.

As shown in FIG. 9, the controller 320 may control the output unit 310 to output a notification event 311 inquiring whether to maintain output conversion. Herein, the notification event 311 may include all methods to notify a user that a multimedia output environment has changed via visual and/or aural means.

In FIG. 9, a case in which the controller 320 outputs the notification event 311 inquiring whether to maintain output conversion in the form of a pop-up window via the output unit 310 of the mobile apparatus 300 and via the external apparatus 100 is shown. However, the controller 320 may output the notification event 311 inquiring whether to maintain output conversion via any one of the external apparatus 100 and the output unit 310 of the mobile apparatus 300.

The user may see the notification event 311 inquiring whether to maintain output conversion, and apply an input for cancelling output conversion. If an input for cancelling output conversion is applied, the controller 320 may stop outputting multimedia content via the external apparatus 100. However, if an input for maintaining output conversion is applied, the controller 320 may maintain the current state.

So far, an output conversion method that is performed when the external apparatus 100 is in a power-off state has been described. Hereinafter, an output conversion method that is performed when the external apparatus 100 is in a power-on state will be described with reference to FIGS. 10A, 10B, and 10C.

Figure 10A:
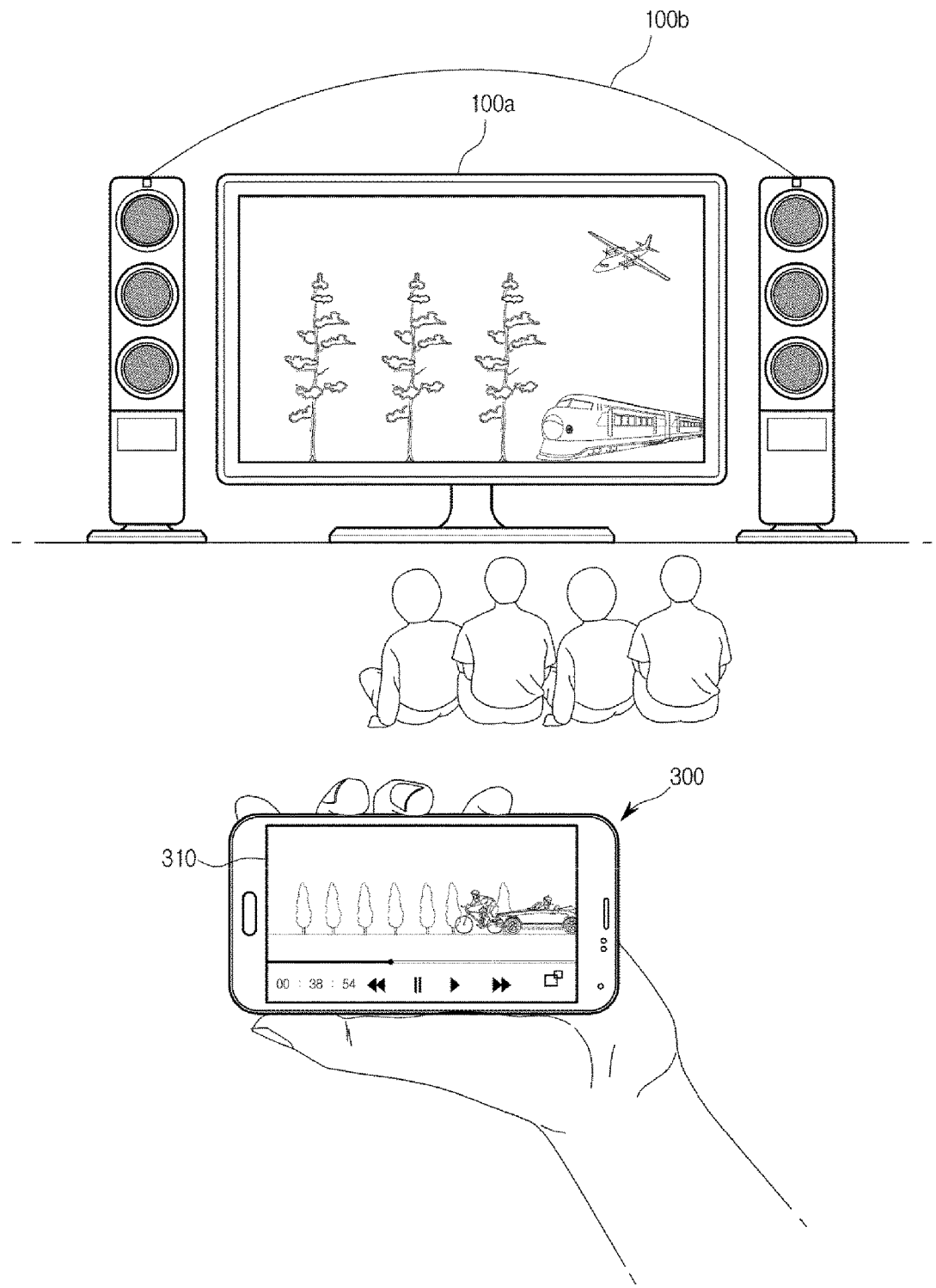
FIGS. 10A, 10B, and 10C are views for describing an output conversion method, according to another exemplary embodiment.
Figure 10B:
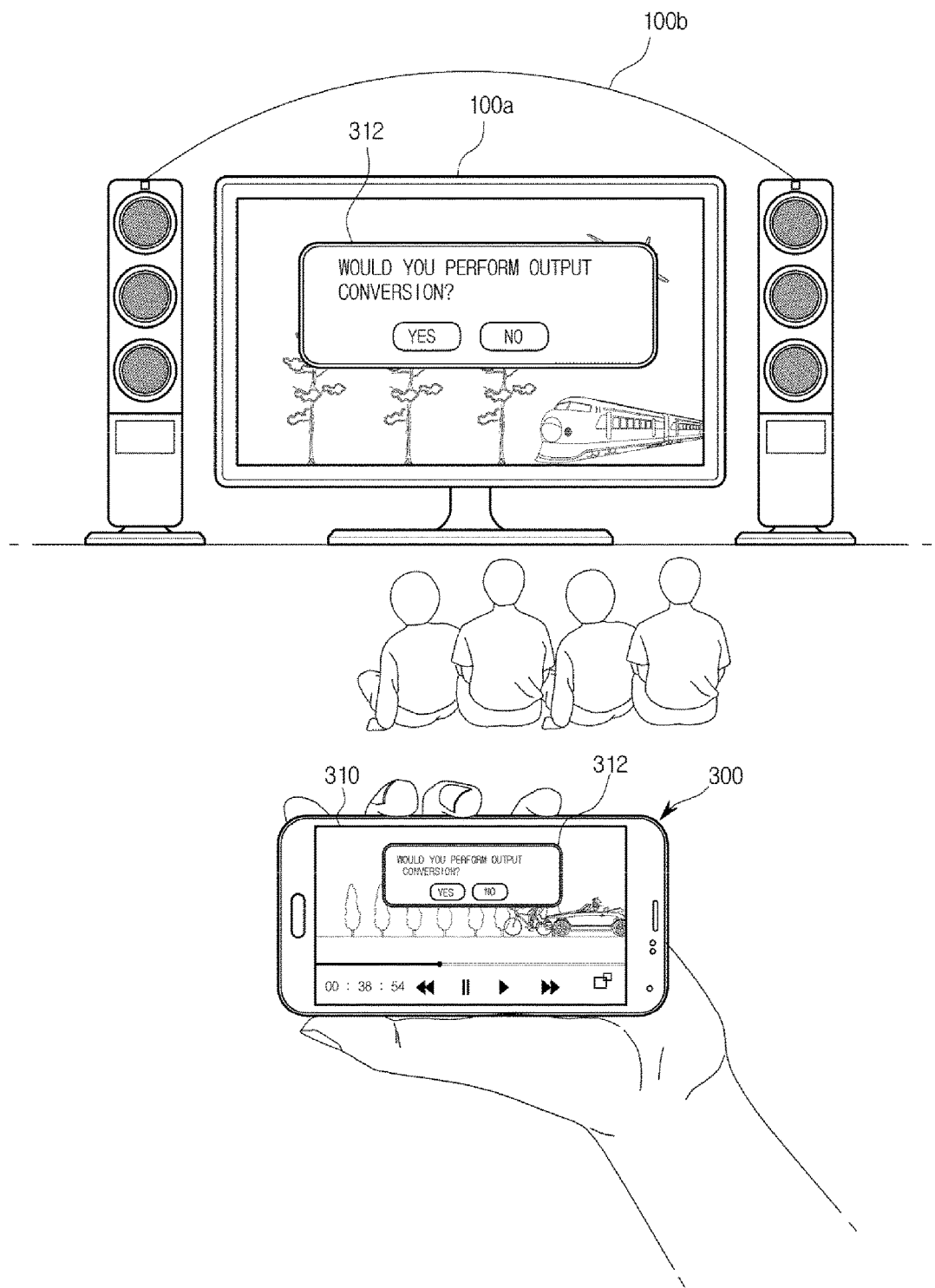
Figure 10C:
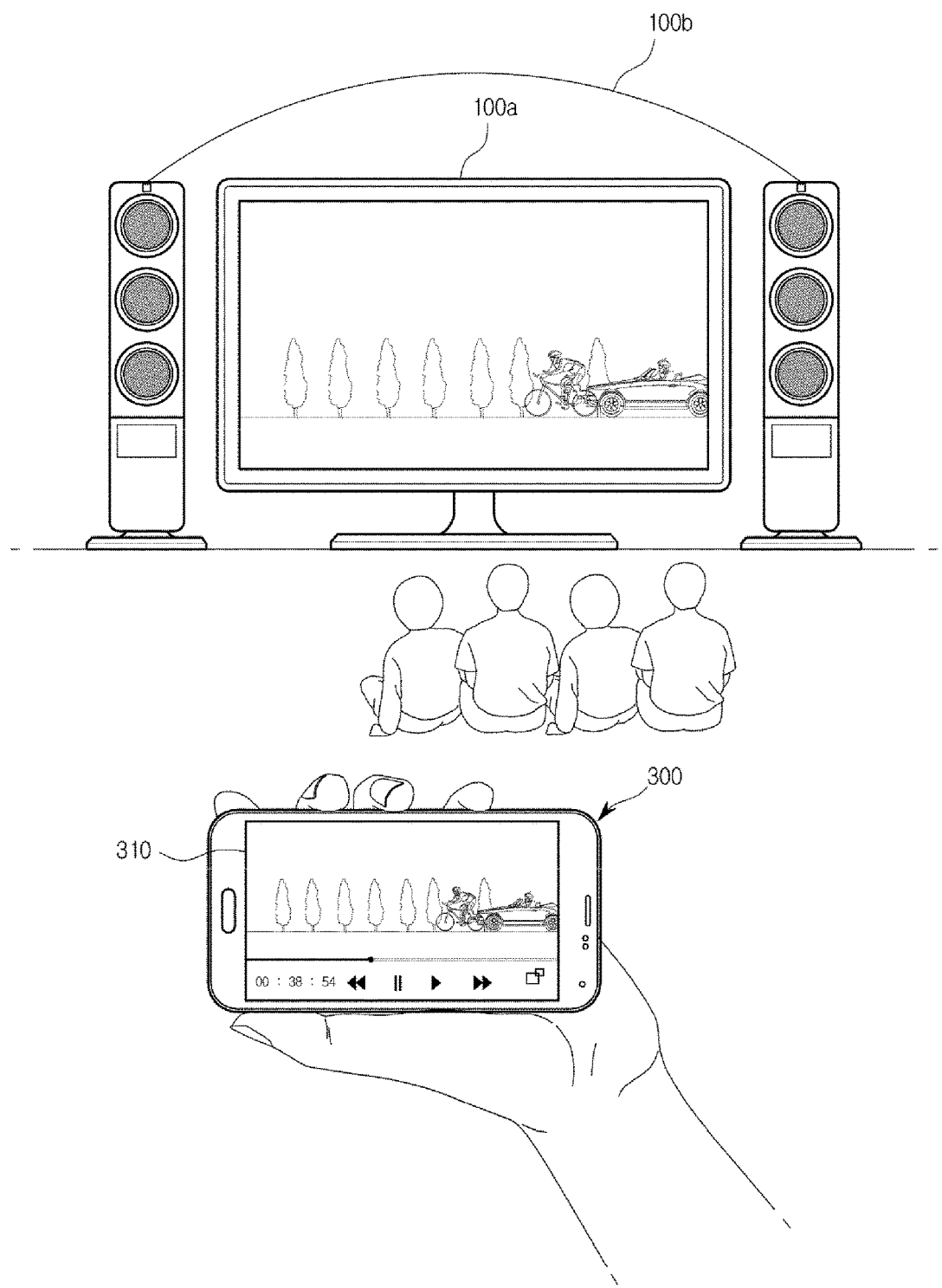

FIGS. 10A, 10B, and 10C are views for describing an output conversion method, according to another exemplary embodiment. For convenience of description, a home area is assumed to be an area in which the mobile apparatus 300 can connect to WiFi via an AP. Also, it is assumed that video has been set to correspond to the TV 100*a*, as shown in FIG. 5B.

There is a case in which when the controller 320 tries to output multimedia content being output on the mobile apparatus 300 via the external apparatus 100 connected to a home network, the external apparatus 100 is outputting another multimedia content. In FIG. 10A, a case in which when the mobile apparatus 300 enters a home, the external apparatus 100 is outputting another multimedia content is shown.

In this case, if the multimedia content being output on the external apparatus 100 is stopped and the multimedia content being output on the mobile apparatus 300 is output via the external apparatus 100, another user who was watching the multimedia content via the external apparatus 100 may experience inconvenience. Accordingly, it is necessary to enable a user to select whether to perform output conversion.

In order to enable a user to select whether to perform output conversion, the controller 320 may output multimedia content via the external apparatus 100 only when receiving an input that relates to approving outputting multimedia content being output on the mobile apparatus 300 via the external apparatus 100.

In FIG. 10B, a case in which a notification event 312 inquiring whether to output multimedia content being output on the mobile apparatus 300 via the external apparatus 100 is output on the external apparatus 100 is shown. Herein, the notification event 312 may include any methods to notify a user that a multimedia output environment has changed via visual and/or aural means. In FIG. 10B, the controller 320 may output the notification event 312 inquiring whether to approve output conversion, in the form of a pop-up window, via the external apparatus 100 and the output unit 310 of the mobile apparatus 300.

In FIG. 10B, a case in which the controller 320 outputs the notification event 312 inquiring whether to approve output conversion via both the external apparatus 100 and the output unit 310 of the mobile apparatus 300 is shown. However, the controller 320 may output the notification event 312 inquiring whether to approve output conversion through any one of the external apparatus 100 and the output unit 310 of the mobile apparatus 300.

If the user sees the notification event 312 inquiring whether to approve output conversion, and applies an input for approving outputting multimedia content being output on the mobile apparatus 300 via the external apparatus 100, the multimedia content may be output via the external apparatus 100, as shown in FIG. 10C.

In contrast, if the user applies an input for rejecting outputting multimedia content being output on the mobile apparatus 300 via the external apparatus 100, the multimedia content being output on the external apparatus 100 may continue to be output.

As described above, when a multimedia output setting is performed, a plurality of external apparatuses 100 may be allocated respective priorities and set to correspond to a kind of multimedia content. In this case, the controller 320 may determine an external apparatus 100 that is to output multimedia content being output on the output unit 310, based on the priorities and/or at least one predetermined criterion.

For example, in correspondence to music, the speaker 100b may be set to a first-priority external apparatus, and the TV 100a may be set to a second-priority external apparatus. If the mobile apparatus 300 connects to a home network while outputting music, the controller 320 may determine whether the speaker 100b being the first-priority external apparatus corresponding to music is in a power-off state. If the controller 320 determines that the speaker 100b is in the power-off state, the controller 320 may power on the speaker 100b, and then output music via the speaker 100b, since the speaker 100b is not being used. However, if the speaker 100b is in a power-on state, the controller 320 may determine that the speaker 100b is being used, and determine whether the TV 100a being the second-priority external apparatus is in a power-off state. If the controller 320 determines that the TV 100a is in the power-off state, the controller 320 may power on the TV 100a, and output music via the TV 100a Meanwhile, when the mobile apparatus 300 and the external apparatus 100 are connected to the same network 200, the mobile apparatus 300 and the external apparatus 100 can exchange data. Accordingly, it is possible to notify and control changes in state of the mobile apparatus 300 or the external apparatus 100 connected to the network 200, as well as to perform output conversion.

Figure 11B:
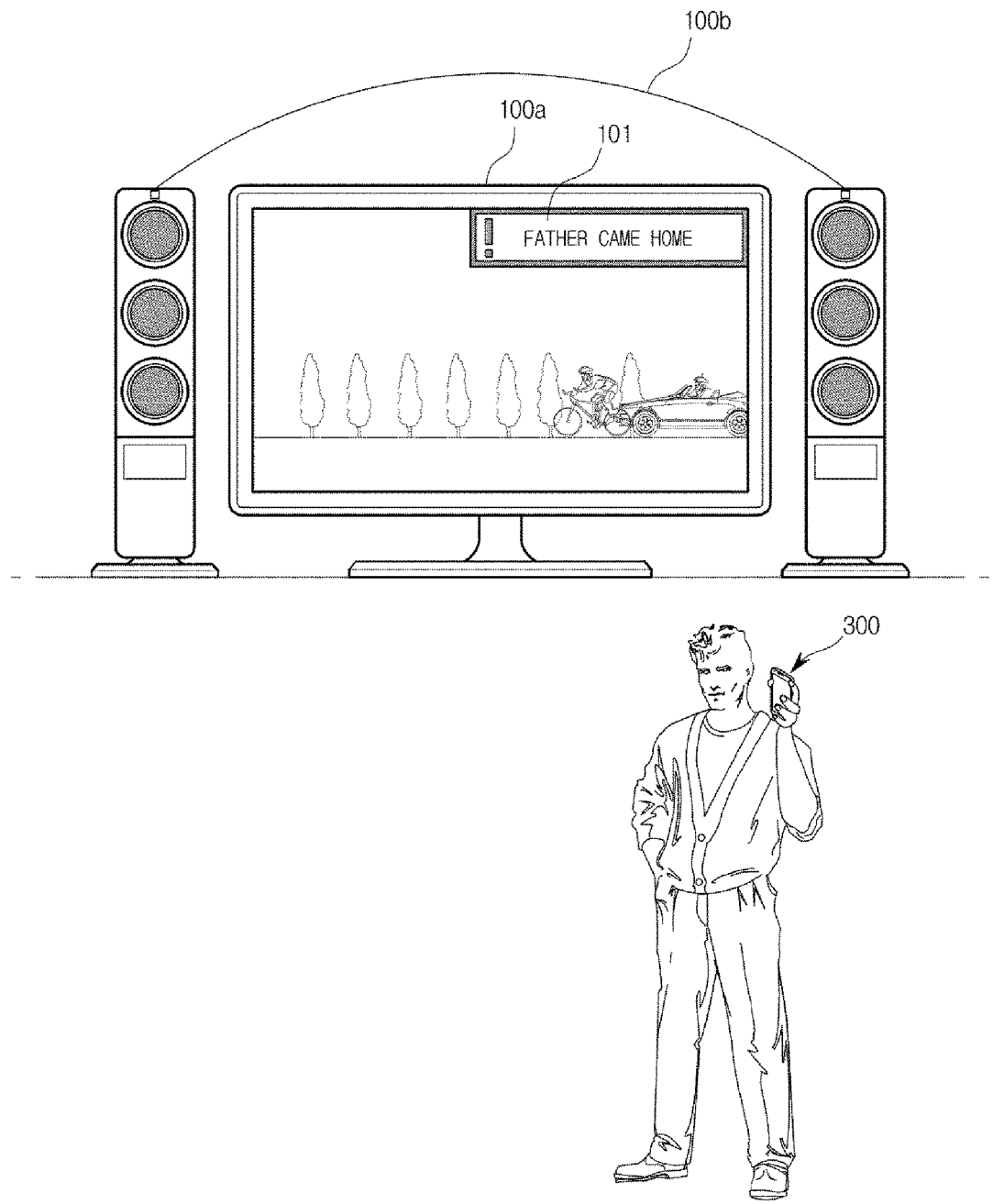

FIGS. 11A and 11B are views for describing an exemplary embodiment of a method for displaying a network connection state in the mobile apparatus 300, according to an exemplary embodiment.

If a plurality of mobile apparatuses 300 can be connected to a home network, an external apparatus 100 may identify the individual mobile apparatuses 300. Accordingly, a predetermined external apparatus 100 may identify a connection of a specific mobile apparatus 300.

In FIG. 11A, a case in which a mobile apparatus 300 enters a home and connects to a home network is shown. Since a mobile apparatus is used generally by one user, the fact that a specific mobile apparatus has connected to a home network may indicate that a user of the mobile apparatus has entered the home. In the exemplary embodiment of FIG. 11A, a user of the mobile apparatus 300 connected to the home network is assumed to be a father among family members.

If the mobile apparatus 300 connects to the home network, the controller 320 may output a notification event 101 notifying a connection of the mobile apparatus 300 to the home network, via a predetermined external apparatus 100. Herein, the notification event 101 may include any or all methods to notify the user that a multimedia output environment has changed via visual and/or aural means. In FIG. 11B, a case in which the controller 320 outputs the notification event 101 notifying a connection of the mobile apparatus 300 to the home network in the form of a pop-up window via the output unit 310 of the TV 100a is shown.

The notification event 101 notifying a connection of the mobile apparatus 300 to the home network may be an event notifying that the mobile apparatus 300 has connected to the home network, or an event notifying that a user of the mobile apparatus 300 has entered the home, as shown in FIG. 11B.

Further, if a notification event for a setting of an external apparatus occurs, the same notification event may be output on the mobile apparatus 300 connected to the same network 200 to which the external apparatus 100 is connected. The user may see the notification event for the setting of the external apparatus output on the mobile apparatus 300, and apply an appropriate control input to easily control the external apparatus 100 connected to the network 200 to which the mobile apparatus 300 is connected.

FIG. 12 is a view for describing an exemplary embodiment of a method for outputting an external apparatus setting event in the mobile apparatus 300, according to an exemplary embodiment.

As shown in FIG. 12, the TV 100a may determine whether there is driving software that needs to be updated, and generate, if there is driving software that needs to be updated, a notification event 313 inquiring whether to perform an update. Simultaneously, the notification event 313 may be output on the output unit 310 of the mobile apparatus 300 connected to a network 200 to which the TV 100*a* is connected. If a user applies an input for controlling update through the mobile apparatus 300, the TV 100*a* may be updated.

In FIG. 12, a case in which a pop-up window inquiring whether to perform an update is displayed as a notification event for a setting of the TV 100*a* is shown. However, a notification event for a setting of an external apparatus 100 may include a notification event notifying a connection of new equipment, such as 3D glasses or a Bluetooth speaker, a notification event notifying a connection of a new network, etc.

Figure 13:
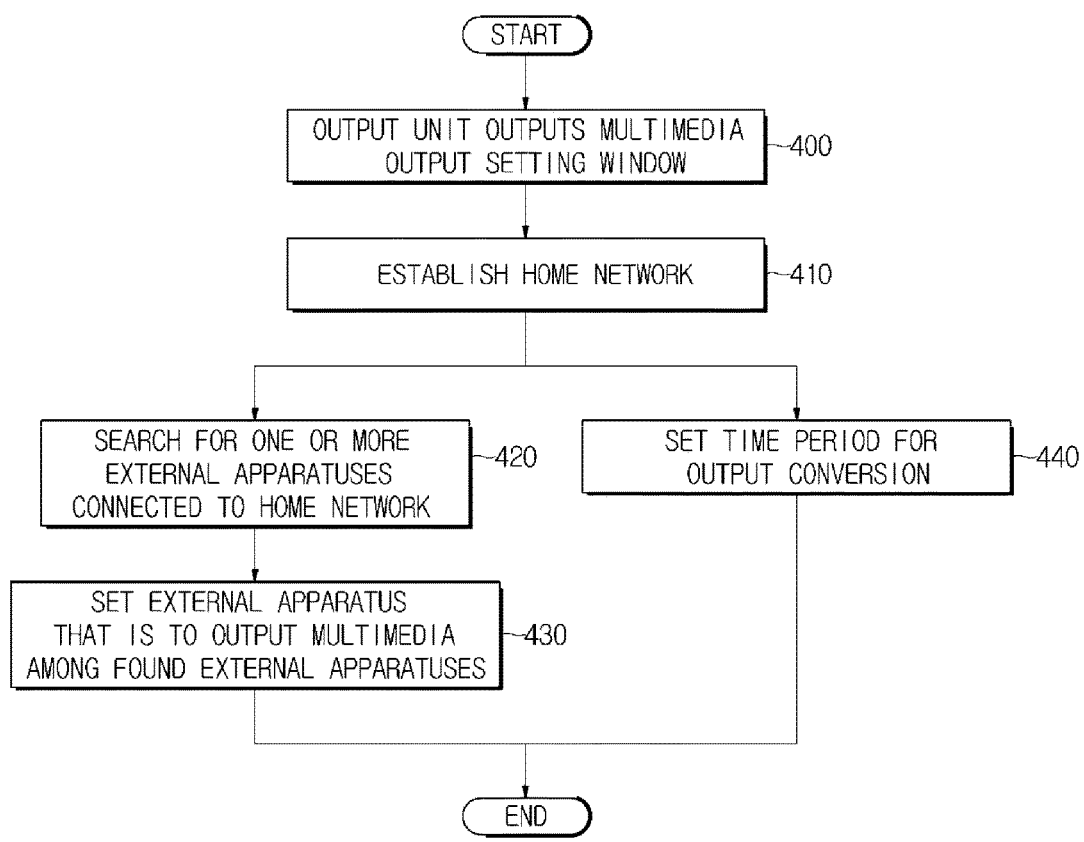
FIG. 13 is a flowchart illustrating an exemplary embodiment of a multimedia output setting method, in a method for controlling a mobile apparatus, according to an exemplary embodiment.

FIG. 13 is a flowchart illustrating an exemplary embodiment of a multimedia output setting method, in a method for controlling the mobile apparatus 300, according to an exemplary embodiment.

First, an output unit may output a multimedia output setting window, in operation 400. Then, a user may apply an input for setting output conversion via the multimedia output setting window.

If the multimedia output setting window is output, the mobile apparatus 300 may receive an input for a home network setting from the user to establish a home network according to the input, in operation 410. More specifically, the output unit 310 may display a list of networks to which the mobile apparatus 300 can be connected, and the user may apply an input for selecting a network which he/she wants to establish as a home network from the list of networks. Then, the controller 320 may establish a home network according to the input from the user.

If the home network is established, the user may set an external apparatus 100 to which output conversion is to be performed, according to a kind of multimedia content. In order to enable the user to set an external apparatus 100 to which output conversion is to be performed, the mobile apparatus 300 may search for one or more external apparatuses 100 connected to the home network, in operation 420. The user may apply an input for selecting an external apparatus 100 to which output conversion is to be performed from among the found external apparatuses 100. Then, the controller may set an external apparatus 100 that is to output multimedia content, according to the input from the user, in operation 430.

Further, the user may set a time period for which output conversion is performed, in operation 440. In particular, if the user inputs a start time and an end time, the mobile apparatus 300 may output no multimedia content via the external apparatus 100 except for a time period from the start time to the end time.

Figure 14:
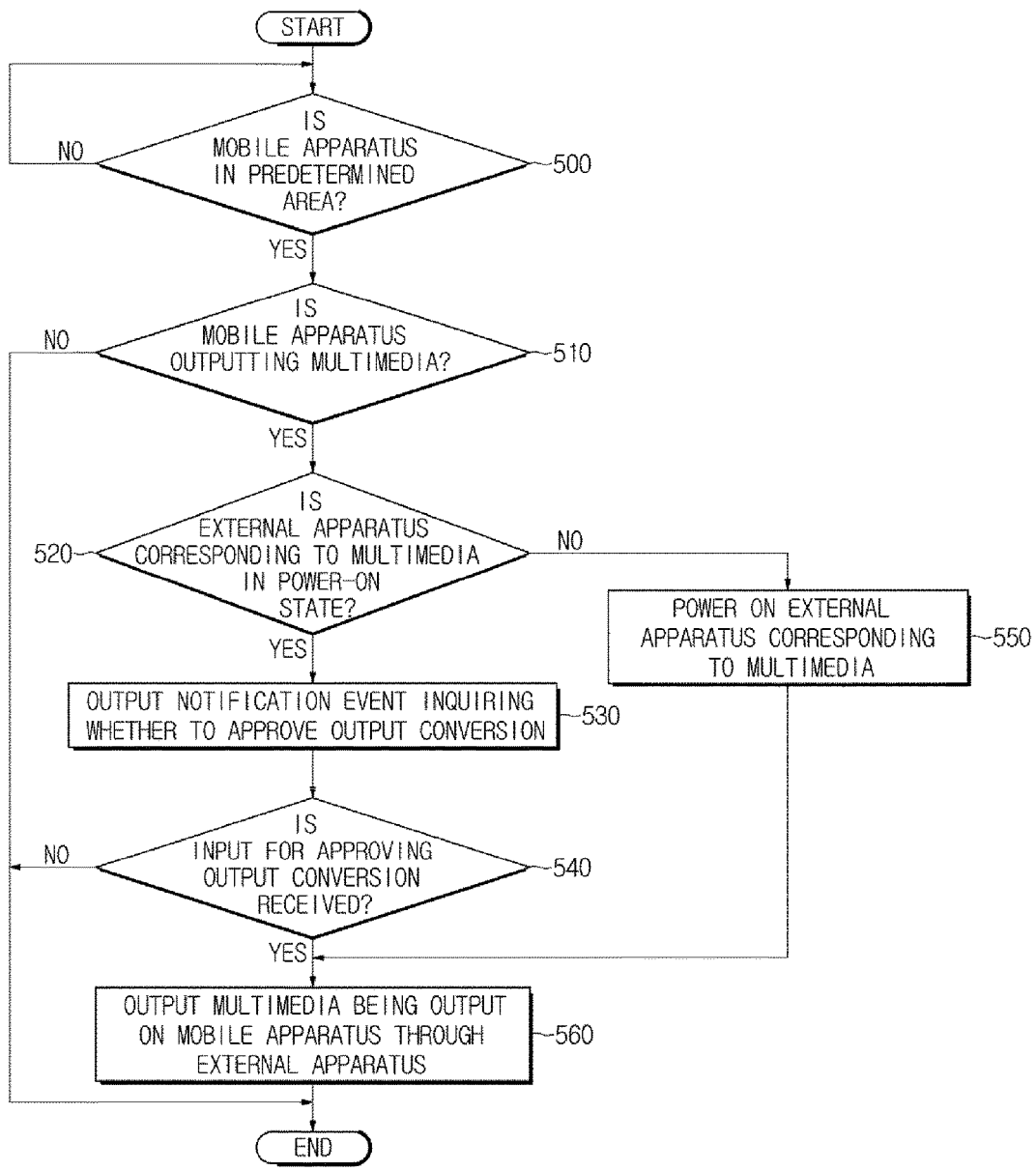
FIG. 14 is a flowchart illustrating an exemplary embodiment of a multimedia output conversion method, in a method for controlling a mobile apparatus, according to an exemplary embodiment.

FIG. 14 is a flowchart illustrating an exemplary embodiment of a multimedia output conversion method, in a method for controlling the mobile apparatus 300, according to an exemplary embodiment.

First, it may be determined whether the mobile apparatus 300 is in a predetermined area, in operation 500. Herein, the predetermined area may refer to an area in which the mobile apparatus 300 can connect to a home network. In particular, it may be determined whether the mobile apparatus 300 connects to a home network in order to perform output conversion when the mobile apparatus 300 connects to the home network.

If it is determined that the mobile apparatus 300 connects to the home network, it may be determined whether the output unit 310 of the mobile apparatus 300 is outputting multimedia content, in operation 510. Since output conversion with respect to multimedia content being output when the mobile apparatus 300 connects to the home network is performed, it may be determined whether the mobile apparatus 300 is outputting multimedia content.

If it is determined that the mobile apparatus 300 is outputting multimedia content, the power-on/off state of an external apparatus 100 corresponding to the multimedia content may be determined, in operation 520. If the external apparatus 100 corresponding to the multimedia content is in a power-on state, a notification event inquiring whether to approve output conversion may be output, in operation 530. At this time, the notification event may be output via the output unit 310 of the mobile apparatus 300 and/or the external apparatus 100.

After the notification event is output, it may be determined whether an input for approving output conversion is received from a user, in operation 540. If an input for rejecting output conversion is received from the user, no output conversion may be performed.

However, if an input for approving output conversion is received from the user, the multimedia content being output on the mobile apparatus 300 may be output via the external apparatus 100 corresponding to the multimedia content, in operation 560.

Meanwhile, if it is determined that the external apparatus 100 corresponding to the multimedia content is in a power-off state, the external apparatus 100 corresponding to the multimedia content may be powered on, in operation 550.

If the external apparatus 100 is powered on, the multimedia content being output on the mobile apparatus 300 may be output via the external apparatus 100, in operation 560.

So far, a case in which the mobile apparatus 300 controls output conversion according to a predetermined condition has been described. Hereinafter, a case in which output conversion is performed by a display apparatus which is a component of the external apparatus 100 will be described.

Figure 15:
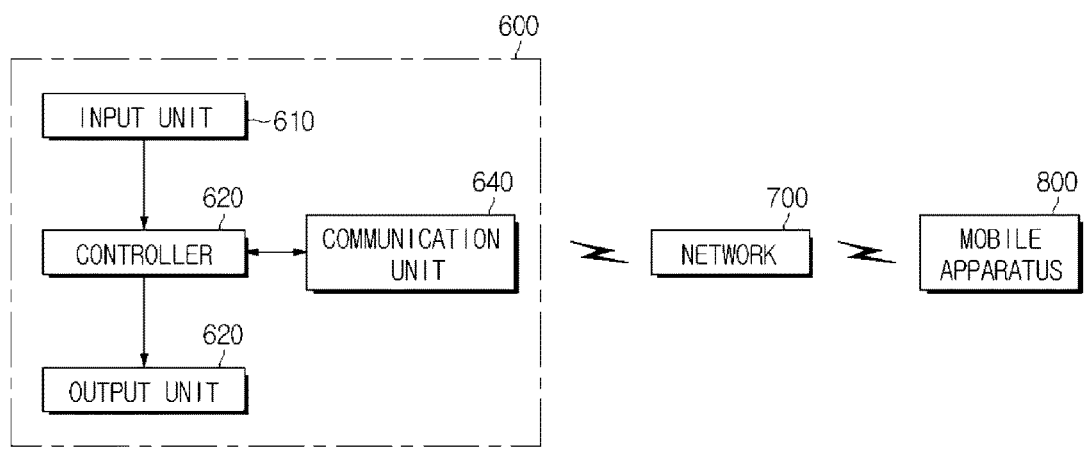
FIG. 15 is a block diagram of a display apparatus, according to an exemplary embodiment, which is a component of a multimedia system.

FIG. 15 is a block diagram of a display apparatus 600, according to an exemplary embodiment, which is a component of a multimedia system. The display apparatus 600 can output video, and also can additionally output music, pictures, or text. The display apparatus 600 may be the TV 100*a*. The display apparatus 600 is assumed to be one of external apparatuses 100 of a multimedia system.

The display apparatus 600 included in the external apparatuses 100 of the multimedia system may connect to a network 700 in order to transmit/receive data to/from a mobile apparatus 800 and/or to/from another external apparatus 100.

In particular, if automatic output conversion with respect to a predetermined kind of multimedia content is set between the display apparatus 600 and the mobile apparatus 800, multimedia content being output on the mobile apparatus 800 when the mobile apparatus 800 connects to a home network may be output via the display apparatus 600.

In order to perform such output conversion, the display apparatus 600 may include: an output unit (also referred to herein as an "output device") 630 configured to output multimedia content being output on the mobile apparatus 800 if the mobile apparatus 800 is located in a predetermined area; a communication unit (also referred to herein as a "communicator" and/or as a "transceiver") 640 configured to receive data about the multimedia from the mobile apparatus 800; an input unit (also referred to herein as an "input device") 610 configured to receive a control input from a user; and a controller 620 configured to control driving of the display apparatus 600.

The display apparatus 600 may be set in advance to perform output conversion. The setting may be performed by a user, by a manufacturing company upon manufacturing, and/or by internal operation.

The display apparatus 600 may determine whether the mobile apparatus 800 is connected to the network 700 to which the display apparatus 600 is currently connected, according to a predetermined condition. If the mobile apparatus 800 is connected to the network 700 while outputting multimedia content set to be subject to output conversion, the output unit 630 of the display apparatus 600 may output the multimedia content being output on the mobile apparatus 800.

In order to output multimedia content via the output unit 630 of the display apparatus 600, the communication unit 640 of the display apparatus 600 may receive multimedia data according to a predetermined kind of multimedia content from the mobile apparatus 800. For example, if the mobile apparatus 800 is outputting multimedia content stored therein, the communication unit 640 of the display apparatus 600 may receive streaming data that relates to the multimedia content from the mobile apparatus 800. Further, if the mobile apparatus 800 is outputting multimedia content in a streaming mode, the communication unit 640 of the display apparatus 600 may receive a URL address that relates to the multimedia content from the mobile apparatus 800. Still further, if the mobile apparatus 800 is outputting multimedia content based on DMB signals, the communication unit 640 of the display apparatus 600 may receive channel information that relates to the multimedia content from the mobile apparatus 800.

If the display apparatus 600 is in a power-off state, the display apparatus 600 may be powered on, and then perform output conversion.

Meanwhile, if the display apparatus 600 is in a power-on state, the output unit 630 of the display apparatus 600 may output a notification event 312 inquiring whether to approve output conversion. If the input unit 610 receives an input for approving output conversion from the user, the output unit 630 of the display apparatus 600 may output the multimedia content being output on the mobile apparatus 800.

After output conversion is completed, the output unit 630 of the display apparatus 600 may output a notification event 311 inquiring whether to maintain output conversion. If the input unit 610 receives an input for rejecting output conversion from the user, the output unit 630 of the display apparatus 600 may cancel output conversion, and return to a state before output conversion is performed.

Meanwhile, if a time period during which output conversion is to be performed has been set in advance, the output unit 630 of the display apparatus 600 may perform output conversion only when the mobile apparatus 800 connects to the network 700 within the time period. Except for the time period, the output unit 630 of the display apparatus 600 may operate regardless of whether the mobile apparatus 800 connects to the network 700.

Further, the display apparatus 600 may determine whether the mobile apparatus 800 connects to the network 700, and display a notification event 101 notifying a connection of the mobile apparatus 800 to the network 700 via the output unit 630.

Still further, when the output unit 630 of the display apparatus 600 outputs a notification event for a setting of the display apparatus 600, the controller 320 of the display apparatus 600 may cause the notification event to be output via the mobile apparatus 800. If the user sees the notification event via the mobile apparatus 800, and applies an input for the setting of the display apparatus 600 via the input unit 610, a receiver of the display apparatus 600 may receive the input from the user. Then, the controller 320 of the display apparatus 600 may control the display apparatus 600 according to the input from the user.

So far, a case in which the data transmission method of the network 200 is WiFi has been described. Hereinafter, a case in which the data transmission method of the network 200 is Bluetooth will be described.

Figure 16A:
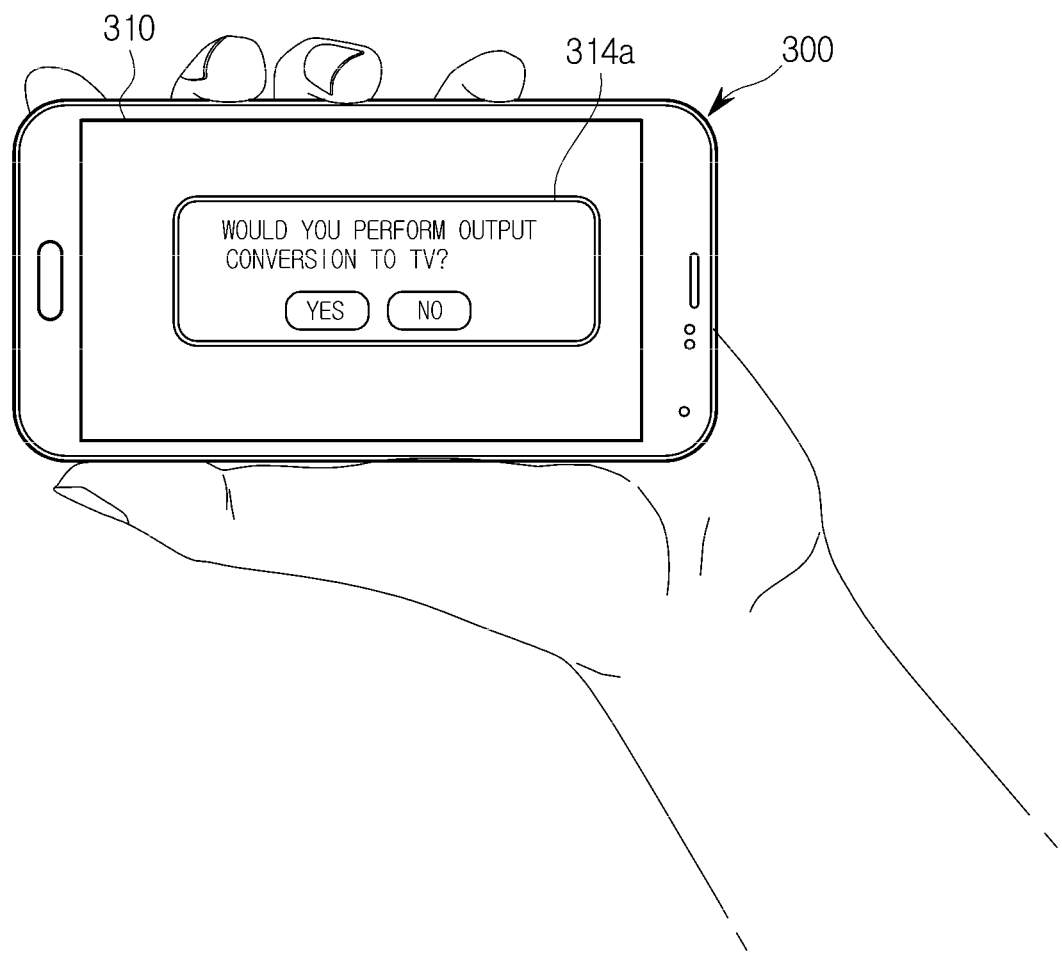
FIGS. 16A and 16B show various exemplary embodiments of notification events inquiring whether to approve output conversion, which are output via a mobile apparatus.
Figure 16B:
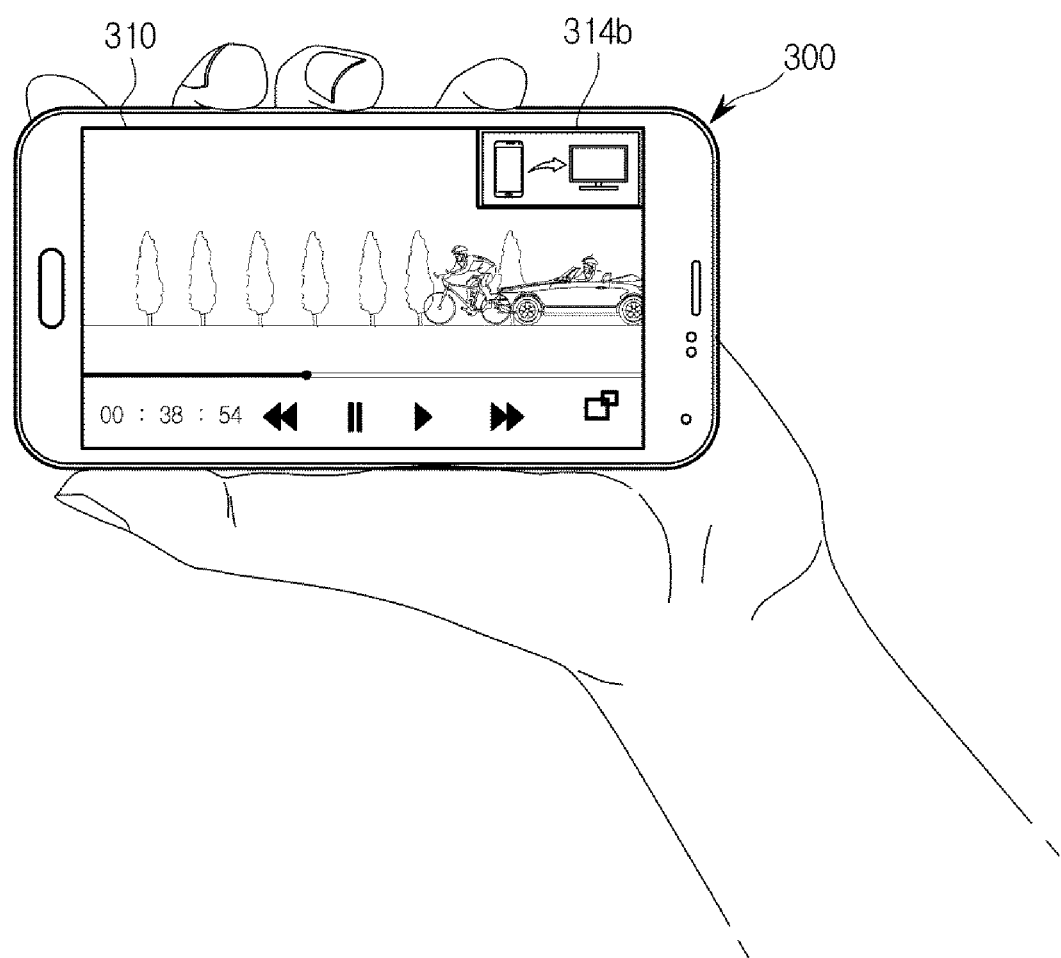

FIGS. 16A and 16B show various exemplary embodiments of notification events inquiring whether to approve output conversion, which are output via the mobile apparatus 300.

Since Bluetooth is a short-range communication method, a mobile apparatus 300 may have high probability of connecting to a single external apparatus 100 in a home via Bluetooth. Accordingly, unlike WiFi, the mobile apparatus 300 may omit an operation of setting output conversion, before output conversion.

Instead, if the mobile apparatus 300 detects an external apparatus 100 with which it can communicate via Bluetooth, the mobile apparatus 300 may display a notification event inquiring whether to approve output conversion. The notification event inquiring whether to approve output conversion, which is displayed on the mobile apparatus 300, may depend on whether the mobile apparatus 300 has ever been paired with the corresponding external apparatus 100.

In FIG. 16A, a notification event (hereinafter, referred to as a first notification event) 314*a* inquiring whether to approve output conversion when the mobile apparatus 300 has never been paired with the external apparatus 100 is shown. If the mobile apparatus 300 enters a Bluetooth communication area while outputting multimedia content, the mobile apparatus 300 may stop outputting multimedia content, and output the first notification event 314*a*.

Herein, the first notification event 314*a* may be in the form of text and/or voice inquiring whether to perform output conversion to the corresponding external apparatus 100. This is aimed at providing detailed guidance to a user who has never performed output conversion to the corresponding external apparatus 100.

Further, unlike the exemplary embodiment of FIG. 16A, the mobile apparatus 300 may output the first notification event 314*a* while continuing to output multimedia content in the background, in order to prevent the multimedia content from being interrupted.

The user may see the first notification event 314*a*, and apply an input for approving output conversion. If an input for approving output conversion is received from the user, the mobile apparatus 300 may perform a Bluetooth pairing with the external apparatus 100.

Since the pairing is a first pairing with the external apparatus 100, the mobile apparatus 300 may output an authentication screen for security. More specifically, the mobile apparatus 300 may output a screen requesting a user to input a personal identification number (PIN) code of the external apparatus 100. If a correct PIN code is input on the screen, the mobile apparatus 300 may complete a security authentication procedure, and perform the pairing with the external apparatus 100.

After the pairing is completed, the mobile apparatus 300 may transmit data for the multimedia content being output just before outputting the first notification event 314*a*, to the external apparatus 100, in a Bluetooth mode. The data for the multimedia content has been described above with respect to the exemplary embodiment regarding WiFi, and accordingly, a further description thereof will be omitted.

In FIG. 16B, a notification event (hereinafter, referred to as a second notification event) 314b inquiring whether to approve output conversion when the mobile apparatus 300 has previously been paired with the external apparatus 100 is shown. If the mobile apparatus 300 enters a Bluetooth communication area while outputting multimedia content, the mobile apparatus 300 may output the second notification event 314b while continuing to output multimedia content.

Herein, the second notification event 314b may be in the form of an icon, such as an image intuitively inquiring whether to perform output conversion to the external apparatus 100. This is aimed at preventing multimedia content from being interrupted, and at enabling a user who has performed output conversion to the external apparatus 100 to easily apply an input for approving output conversion.

The user may see the second notification event 314b, and apply an input for approving output conversion. In FIG. 16B, the user may easily apply an input for approving output conversion by touching the icon. If an input for approving output conversion is applied by the user, the mobile apparatus 300 may perform a pairing with the external apparatus 100 without performing a separate security authentication procedure. Since the mobile apparatus 300 has previously performed a pairing with the external apparatus 100, the mobile apparatus 300 can perform the pairing quickly.

After the pairing is completed, the mobile apparatus 300 may transmit data for the multimedia content being currently output, to the external apparatus 100, in a Bluetooth mode. The data for the multimedia content has been described above with respect to the exemplary embodiment regarding WiFi, and accordingly, a further description thereof will be omitted.

So far, a case in which the mobile apparatus 300 connects to one external apparatus 100 in a home has been described. However, the mobile apparatus 300 can connect to a plurality of external apparatuses 100 in the home via Bluetooth.

Figure 17:
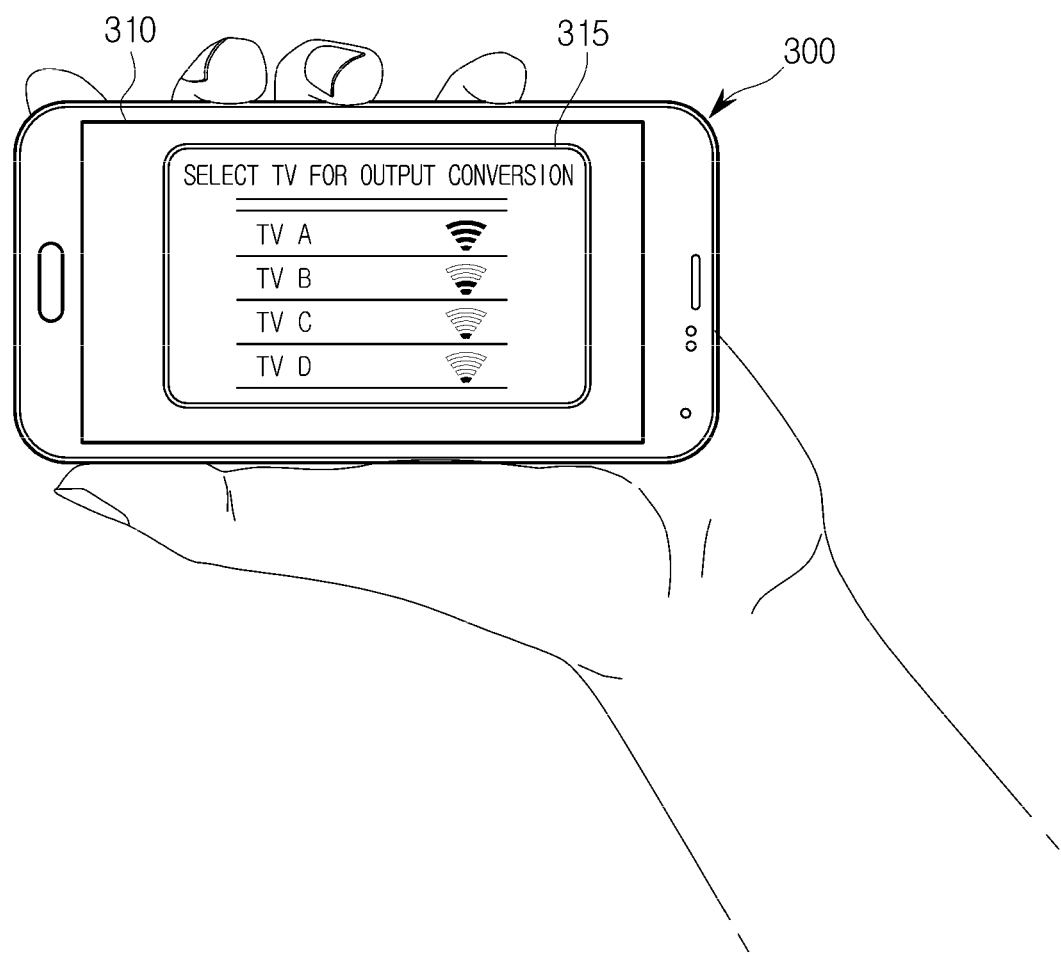
FIG. 17 shows an exemplary embodiment of a notification event for receiving a selection of an external apparatus to which output conversion is to be performed, which is displayed on a mobile apparatus.

FIG. 17 shows an exemplary embodiment of a notification event for receiving a selection of an external apparatus to which output conversion is to be performed, which is displayed on the mobile apparatus 300.

If the mobile apparatus 300 enters a Bluetooth communication area while outputting multimedia content, the mobile apparatus 300 may output a notification event (hereinafter, referred to as a third notification event) 315 for receiving a selection of an external apparatus 100 to which output conversion is to be performed.

Referring to FIG. 17, the third notification event 315 may provide a user with a list of a plurality of external apparatuses 100 to which output conversion can be performed. In addition, the third notification event 315 may provide information about respective Bluetooth signal strengths for the individual external apparatuses 100. Since a greater Bluetooth signal strength corresponds to a higher communication speed, the user can receive guidance for selecting an optimal external apparatus 100 for output conversion.

If an input for selecting an external apparatus 100 to which output conversion is to be performed is received from the user, the mobile apparatus 300 may perform a Bluetooth pairing with the selected external apparatus 100. If the pairing is completed, the mobile apparatus 300 may transmit data for the multimedia content being output, to the selected external apparatus 100, which has been described above.

However, the mobile apparatus 300 may automatically perform a pairing with an optimal external apparatus 100 selected based on the respective Bluetooth signal strengths for the individual external apparatuses 100. In particular, the mobile apparatus 300 may perform a pairing with an external apparatus 100 having the greatest Bluetooth signal strength. Thereby, the user can receive multimedia content via output conversion to the external apparatus 100 optimized for Bluetooth communication, without having to perform a separate manipulation.

Figure 18:
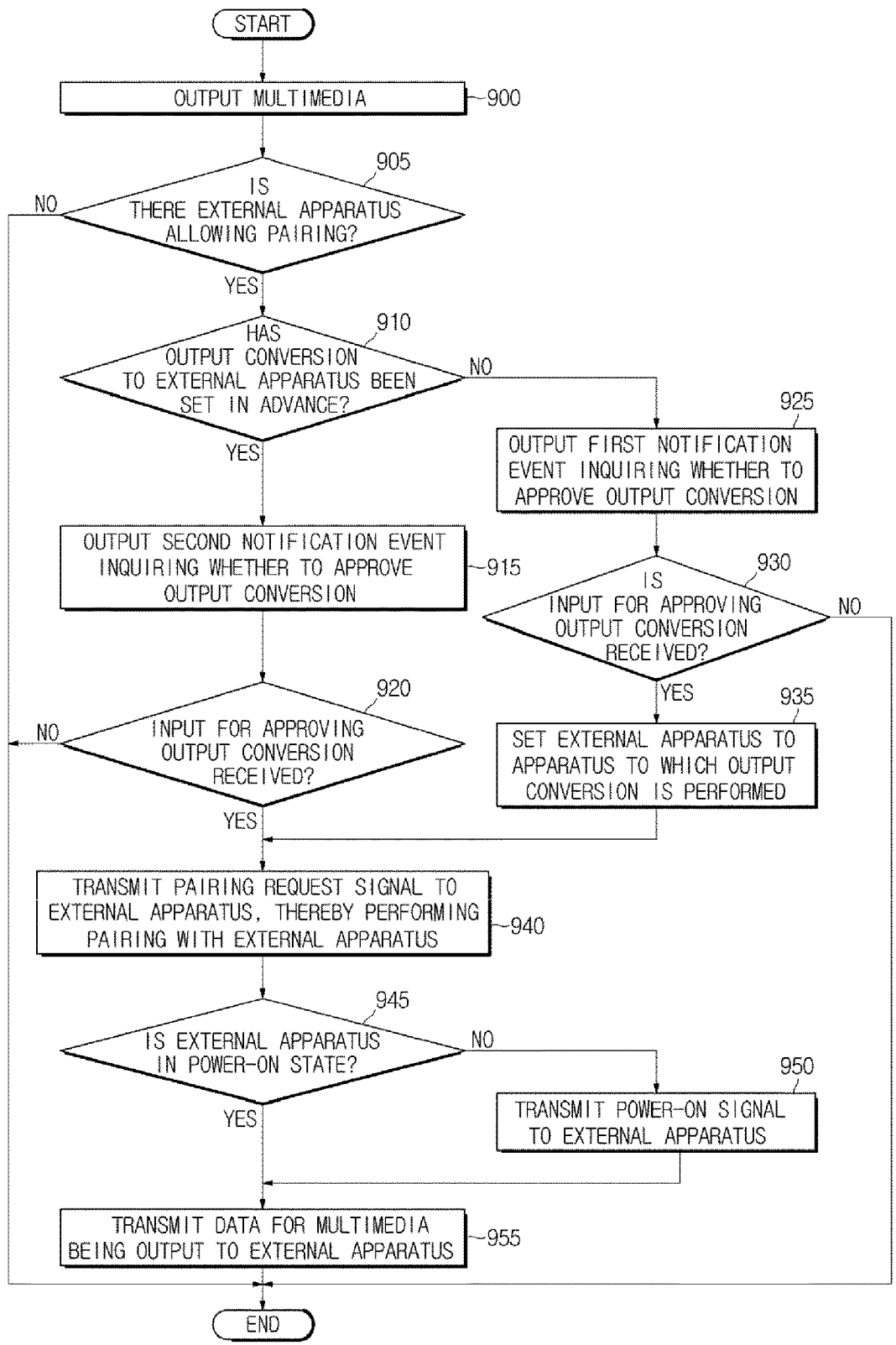
FIG. 18 is a flowchart illustrating an exemplary embodiment of an output conversion method which is performed by a mobile apparatus, when a data transmission method of a network is Bluetooth.

FIG. 18 is a flowchart illustrating an exemplary embodiment of an output conversion method which is performed by the mobile apparatus 300, when a data transmission method of a network uses Bluetooth.

First, the mobile apparatus 300 may output multimedia content, in operation 900. The multimedia content may include at least one from among a picture, music, video, and text.

Then, the mobile apparatus 300 may search for an external apparatus 100 that is compatible with a Bluetooth pairing, in operation 905. If no external apparatus 100 that is compatible with a Bluetooth pairing is found, the process may terminate.

However, if an external apparatus 100 that is compatible with a Bluetooth pairing is found, the mobile apparatus 300 may determine whether output conversion to the corresponding external apparatus 100 has been set in advance, in operation 910. In particular, the mobile apparatus 300 may determine whether it has ever previously been paired with the external apparatus 100.

If the mobile apparatus 300 determines that output conversion to the external apparatus 100 has been set in advance, in other words, that the mobile apparatus 300 has previously been paired with the external apparatus 100, the mobile apparatus 300 may output the second notification event 314b (see FIG. 16B) inquiring whether to approve output conversion, in operation 915. The second notification event 314b may be in the form of an icon, such as an image intuitively inquiring whether to perform output conversion, to the external apparatus 100.

Then, the mobile apparatus 300 may determine whether an input for approving output conversion is received from the user who saw the second notification event 314b, in operation 920. If no input for approving output conversion is received, the process may terminate.

Meanwhile, if the mobile apparatus 300 determines that output conversion to the external apparatus 100 has never been set in advance, in other words, that the mobile apparatus 300 has never been paired with the external apparatus 100, the mobile apparatus 300 may output the first notification event 314a (see FIG. 16A) inquiring whether to approve output conversion, in operation 925. The first notification event 314a may be in the form of text or voice inquiring whether to perform output conversion to the external apparatus 100.

Then, the mobile apparatus 300 may determine whether an input for approving output conversion is received from the user who saw the first notification event 314a, in operation 930. If no input for approving output conversion is received, the process may terminate.

If an input for approving output conversion is received, the mobile apparatus 300 may set the external apparatus 100 to an apparatus to which output conversion is to be performed, in operation 935. Accordingly, when the mobile apparatus 300 is again paired with the external apparatus 100, the mobile apparatus 300 may output the second notification event 314b.

After an input for approving output conversion is received in response to the second notification event 314b or the first notification event 314a, and the mobile apparatus 300 sets the external apparatus 100 to an apparatus to which output conversion is to be performed, the mobile apparatus 300 may transmit a pairing request signal to the external apparatus 100, thereby performing a pairing with the external apparatus 100, in operation 940.

After the pairing is completed, the mobile apparatus 300 may determine whether the external apparatus 100 is in a power-on state, in operation 945. If the external apparatus 100 is in a power-off state, the mobile apparatus 300 may transmit a power-on signal to the external apparatus 100, in operation 950. A method of transmitting a power-on signal may include any of WoL, WoWLAN, and Bluetooth.

If the external apparatus 100 is in the power-on state, or if the external apparatus 100 receives a power-on signal and is powered on, the mobile apparatus 300 may transmit data for multimedia content being output on the mobile apparatus 300, to the external apparatus 100, in operation 955.

Figure 19:
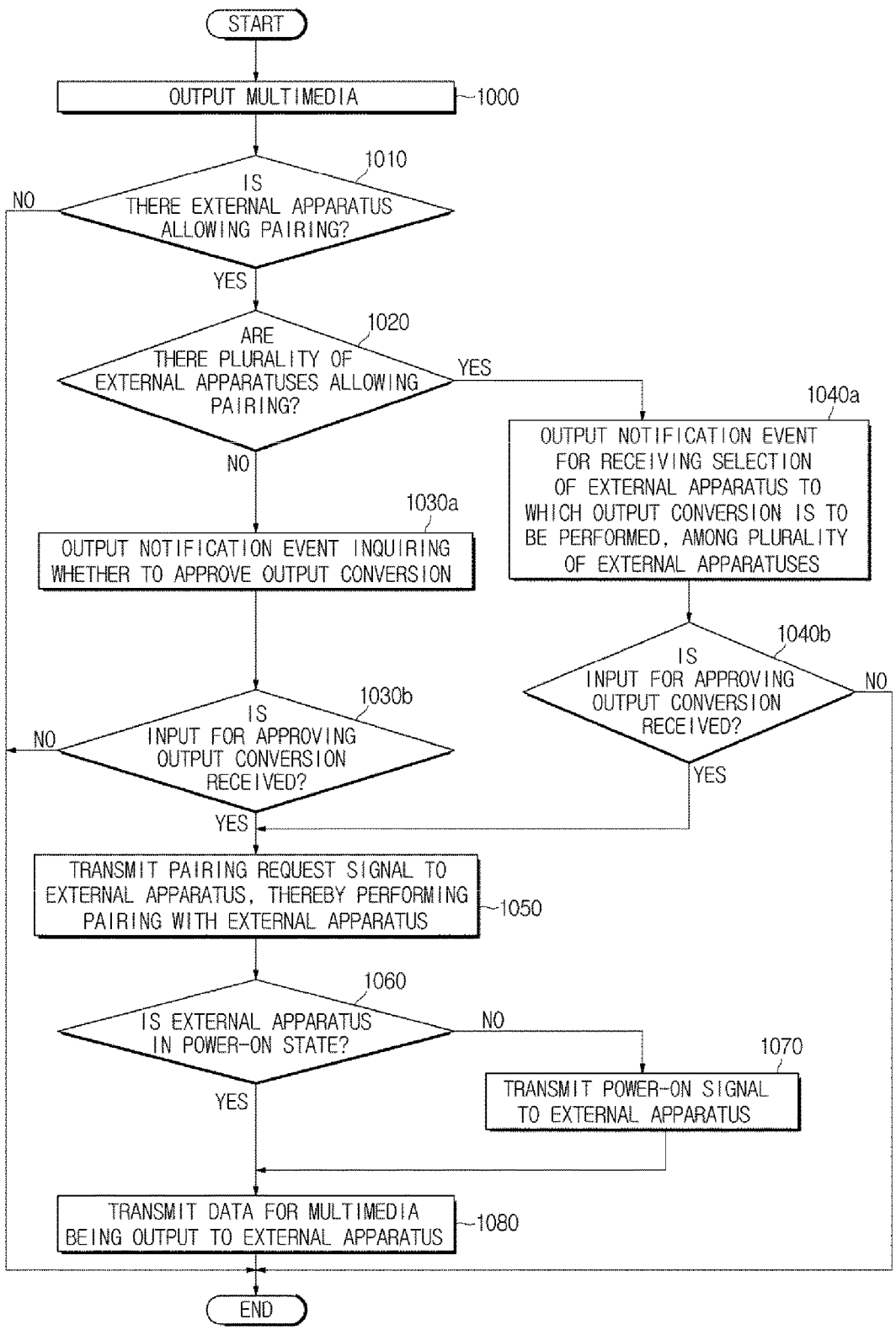
FIG. 19 is a flowchart illustrating another exemplary embodiment of an output conversion method which is performed by a mobile apparatus, when a data transmission method of a network is Bluetooth.

FIG. 19 is a flowchart illustrating another exemplary embodiment of an output conversion method which is performed by the mobile apparatus 300, when a data transmission method of a network is Bluetooth.

First, the mobile apparatus 300 may output multimedia content, in operation 1000. The multimedia content being output on the mobile apparatus 300 may include at least one from among a picture, music, video, and text.

Then, the mobile apparatus 300 may search for an external apparatus 100 that is compatible with a Bluetooth pairing, in operation 1010. If no external apparatus 100 that is compatible with a pairing is found, the process may terminate.

However, if at least one external apparatus 100 that is compatible with a pairing is found, the mobile apparatus 300 may determine whether there are a plurality of external apparatuses 100 that are compatible with a pairing, in operation 1020.

If an external apparatus 100 that is compatible with a pairing is found, the mobile apparatus 300 may output a notification event inquiring whether to approve output conversion, in operation 1030*a*. Then, the mobile apparatus 300 may determine whether an input for approving output conversion is received from a user who sees the notification event inquiring whether to approve output conversion, in operation 1030*b*. If no input for approving output conversion is received, the process may terminate.

Meanwhile, if there are a plurality of external apparatuses 100 that are compatible with a pairing, the mobile apparatus 300 may output a notification event for receiving a selection of an external apparatus to which output conversion is to be performed, among the plurality of external apparatuses 100, in operation 1040*a*. More specifically, the mobile apparatus 300 may display a list of external apparatuses 100 to which output conversion can be performed. Then, the mobile apparatus 300 may determine whether an external apparatus 100 to which output conversion is to be performed is selected, in operation 1040*b*. If no external apparatus 100 to which output conversion is to be performed is selected, the process may terminate.

If an input for approving output conversion is received, or if an external apparatus 100 to which output conversion is to be performed is selected, the mobile apparatus 300 may transmit a pairing request signal to the external apparatus 100, thereby performing a pairing with the external apparatus 100, in operation 1050.

After the pairing is completed, the mobile apparatus 300 may determine whether the external apparatus 100 is in a power-on state, in operation 1060. If the mobile apparatus 300 determines that the external apparatus 100 is in a power-off state, the mobile apparatus 300 may transmit a power-on signal to the external apparatus 100, in operation 1070. A method of transmitting a power-on signal may include any of WoL, WoWLAN, and Bluetooth.

If the external apparatus is in the power-on state, or if the external apparatus receives the power-on signal and is powered on, the mobile apparatus 300 may transmit data for multimedia content being output on the mobile apparatus 300 to the external apparatus 100, in operation 1080.

Figure 20:
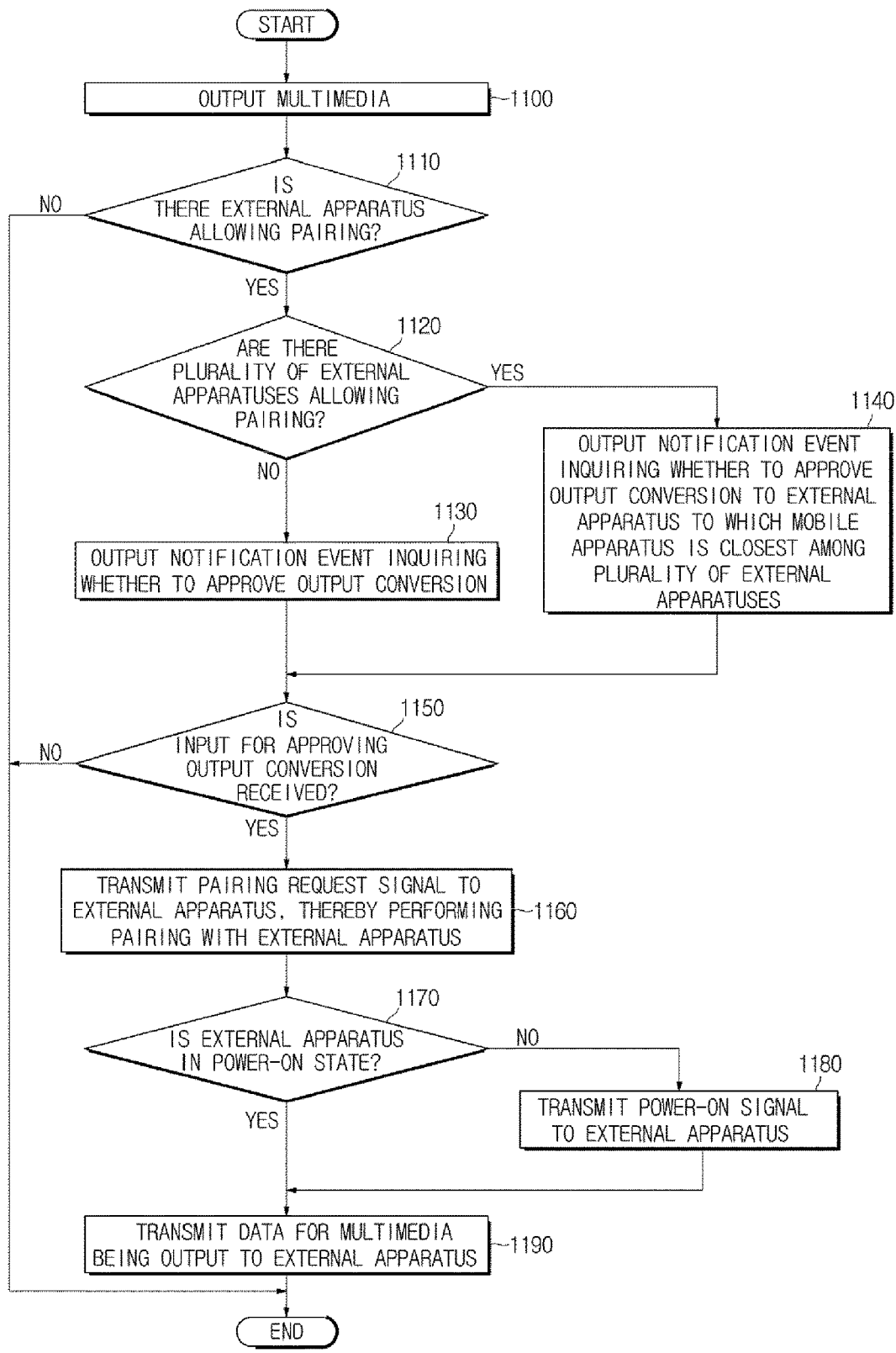
FIG. 20 is a flowchart illustrating still another exemplary embodiment of an output conversion method which is performed by a mobile apparatus, when a data transmission method of a network is Bluetooth.

FIG. 20 is a flowchart illustrating still another exemplary embodiment of an output conversion method which is performed by the mobile apparatus 300, when a data transmission method of a network is Bluetooth.

First, the mobile apparatus 300 may output multimedia content, in operation 1100. The multimedia content being output on the mobile apparatus 300 may include at least one from among a picture, music, video, and text.

Then, the mobile apparatus 300 may search for an external apparatus 100 that is compatible with a Bluetooth pairing, in operation 1110. If no external apparatus 100 that is compatible with a pairing is found, the process may terminate.

However, if an external apparatus that is compatible with a pairing is found, the mobile apparatus 300 may determine whether there are a plurality of external apparatuses 100 that are compatible with a pairing, in operation 1120.

If an external apparatus 100 that is compatible with a pairing is found, the mobile apparatus 300 may output a notification event inquiring whether to approve output conversion, in operation 1130.

If a plurality of external apparatuses 100 that are compatible with a pairing are found, the mobile apparatus 300 may output a notification event inquiring whether to approve output conversion to an external apparatus 100 to which the mobile apparatus 300 is closest among the plurality of external apparatuses 100, in operation 1140. At this time, the mobile apparatus 300 may determine an external apparatus 100 having the greatest Bluetooth signal strength as an external apparatus 100 to which the mobile apparatus 300 is closest.

Then, the mobile apparatus 300 may determine whether an input for approving output conversion is received in response to the notification event inquiring whether to approve output conversion, in operation 1150. If no input for approving output conversion is received, the process may terminate.

However, if an input for approving output conversion is received, the mobile apparatus 300 may transmit a pairing request signal to the external apparatus 100, thereby performing a pairing with the external apparatus 100, in operation 1160.

After the pairing is completed, the mobile apparatus 300 may determine whether the external apparatus 100 is in a power-on state, in operation 1170. If the mobile apparatus 300 determines that the external apparatus 100 is in a power-off state, the mobile apparatus 300 may transmit a power-on signal to the external apparatus 100, in operation 1180. A method of transmitting a power-on signal may include any of WoL, WoWLAN, and Bluetooth.

If the external apparatus 100 is in the power-on state, or if the external apparatus 100 receives a power-on signal and is powered on, the mobile apparatus 300 may transmit data for multimedia content being output on the mobile apparatus 300, to the external apparatus 100, in operation 1190.

Figure 21:
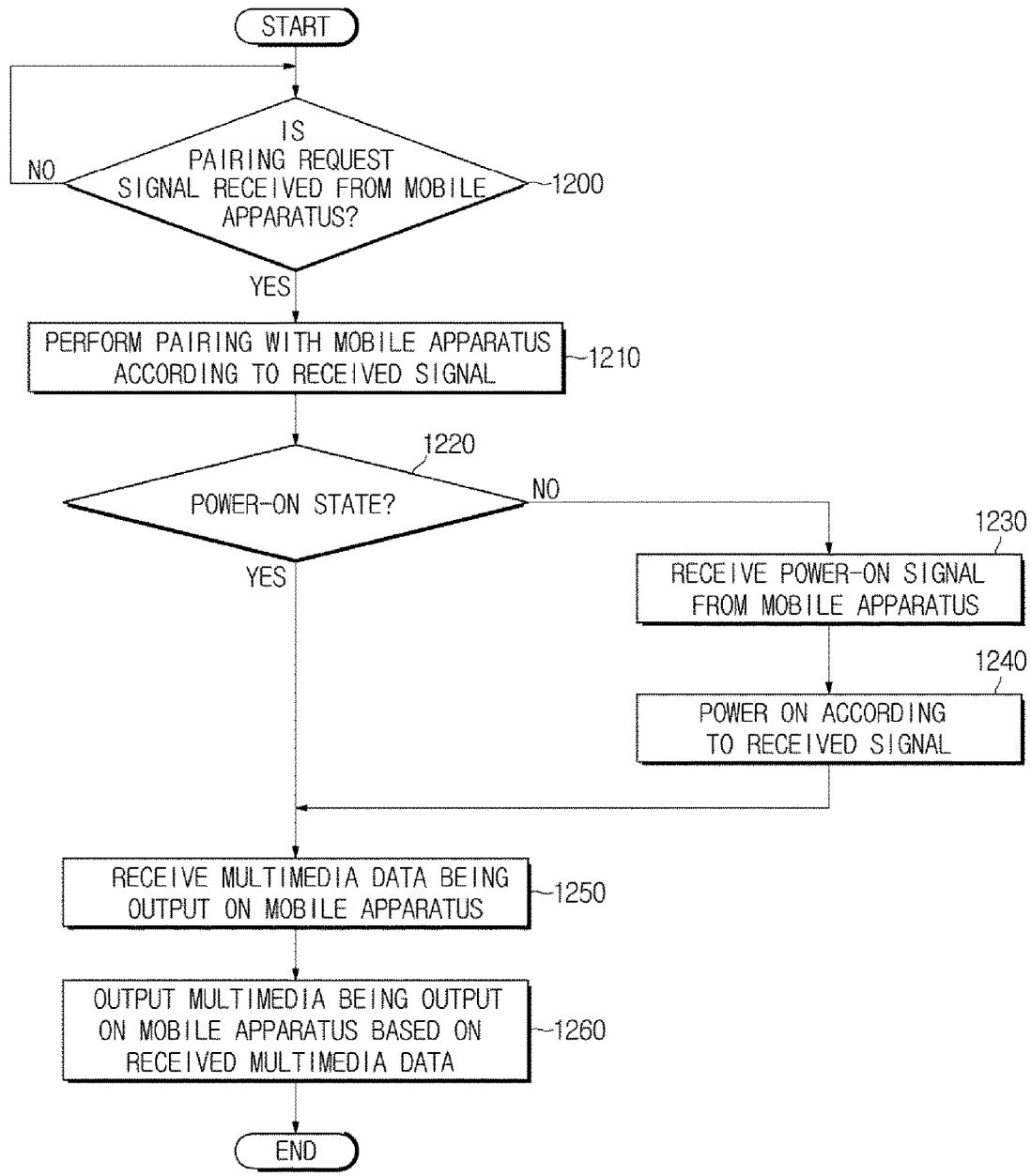
FIG. 21 is a flowchart illustrating an exemplary embodiment of an output conversion method which is performed by a display apparatus, when a data transmission method of a network is Bluetooth.

FIG. 21 is a flowchart illustrating an exemplary embodiment of an output conversion method which is performed by a display apparatus, when a data transmission method of a network is Bluetooth.

First, the display apparatus may determine whether a pairing request signal is received from the mobile apparatus 300, in operation 1200. If no pairing request signal is received from the mobile apparatus 300, the display apparatus may continue to determine whether a pairing request signal is received from the mobile apparatus 300.

If a pairing request signal is received from the mobile apparatus 300, the display apparatus may perform a pairing with the mobile apparatus 300 according to the pairing request signal, in operation 1210.

More specifically, if the display apparatus has never been paired with the mobile apparatus 300, the display apparatus may display a security authentication screen. If the display apparatus checks a correct PIN code input via the security authentication screen, the display apparatus may perform a pairing with the mobile apparatus 300.

However, if the display apparatus has ever previously been paired with the mobile apparatus 300, the display apparatus may perform a pairing with the mobile apparatus 300 without displaying a security authentication screen.

Then, the display apparatus may determine whether it is in a power-on state, in operation 1220. If the display apparatus determines that it is in a power-off state, the display apparatus may receive a power-on signal from the mobile apparatus 300, in operation 1230. A method of receiving a power-on signal may include any of WoL, WoWLAN, and Bluetooth.

The display apparatus may be powered on according to the power-on signal, in operation 1240.

If the display apparatus determines that it is in the power-on state, or if the display apparatus is powered on, the display apparatus may receive multimedia data being output on the mobile apparatus 300 in a Bluetooth mode, in operation 1250.

Finally, the display apparatus may output the multimedia content being output on the mobile apparatus 300 based on the received multimedia data, in operation 1260.

So far, a case in which a data transmission method of a network is WiFi or Bluetooth has been described. However, the mobile apparatus 300 and the display apparatus may adopt both WiFi and Bluetooth, or may selectively adopt one of WiFi and Bluetooth in order to transmit/receive information. More specifically, the mobile apparatus 300 and the display apparatus may select one having the greater signal strength and/or one having higher communication speed from among WiFi and Bluetooth to transmit/receive information.

According to one aspect of the mobile apparatus, the display apparatus, and the multimedia output method using the same, by enabling multimedia content being output on the mobile apparatus to be output via a multimedia apparatus installed in a home without having to apply a separate input, it is possible to provide a user with multimedia content seamlessly.

Although a few exemplary embodiments have been shown and described, it will be appreciated by those of skill in the art that changes may be made in these exemplary embodiments without departing from the principles and spirit of the present inventive concept, the scope of which is defined in the claims and their equivalents.

What is claimed is:

1. A mobile apparatus comprising:
    an output device configured to output first multimedia content;
    a transceiver configured to transmit data that relates to the first multimedia content; and
    a controller configured to:
        determine, when the mobile apparatus enters a predetermined area, whether the mobile apparatus has connected to a network,
        search for a plurality of external apparatuses accessible via the network based on a determination that the mobile apparatus has connected to the network,
        select an external apparatus from among the plurality of external apparatuses based on at least one predetermined criterion, a kind of the first multimedia content and a plurality of priorities, the plurality of priorities respectively corresponding to the plurality of external apparatuses, and
        control the transceiver to transmit data in synchronization with the first multimedia content being output on the mobile apparatus to the selected external apparatus,
    wherein each of the plurality of external apparatuses is configured to output multimedia content.

2. The mobile apparatus according to claim 1, wherein when the selected external apparatus is in a power-on state, the controller is further configured to control the transceiver to output the first multimedia content via the selected external apparatus when an input that relates to approving outputting of the first multimedia content via the selected external apparatus is received.

3. The mobile apparatus according to claim 1, wherein when the selected external apparatus is in a power-off state, the controller is further configured to power on the selected external apparatus, and then to control the transceiver to output the first multimedia content via the selected external apparatus.

4. The mobile apparatus according to claim 3, wherein the transceiver is further configured to transmit a signal for powering on the selected external apparatus by using at least one from among Wake on Lan (WoL), Wake on Wireless Lan (WoWLAN), and Bluetooth.

5. The mobile apparatus according to claim 1, wherein the controller is further configured to control the transceiver to output second multimedia content which is synchronized with the first multimedia content via the selected external apparatus.

6. The mobile apparatus according to claim 1, wherein when the mobile apparatus enters the predetermined area within a predetermined time period, the controller is further configured to control the transceiver to output the first multimedia content via the selected external apparatus.

7. The mobile apparatus according to claim 1, wherein when the first multimedia content is stored in the mobile apparatus, the controller is further configured to control the transceiver to transmit streaming data that relates to the first multimedia content to the selected external apparatus.

8. The mobile apparatus according to claim 1, wherein when the first multimedia content is output in a streaming mode, the controller is further configured control the transceiver to transmit a Uniform Resource Locator (URL) that relates to the multimedia content to the selected external apparatus.

9. The mobile apparatus according to claim 1, wherein when the first multimedia content is output based on a Digital Multimedia Broadcasting (DMB) signal, the controller is further configured to control the transceiver to transmit channel information that relates to the first multimedia content to the selected external apparatus.

10. The mobile apparatus according to claim 1, wherein the transceiver is further configured to transmit the data that relates to the first multimedia content to the selected external apparatus by using at least one from among Wireless Fidelity (WiFi) and Bluetooth.

11. The mobile apparatus according to claim 1, wherein when the mobile apparatus enters the predetermined area, the controller is further configured to notify that the mobile apparatus enters the predetermined area via the selected external apparatus.

12. The mobile apparatus according to claim 1, wherein the output device is further configured to output a notification event that relates to a setting of the selected external apparatus, and
the controller is further configured to control the selected external apparatus based on an input that is received in response to the notification event.

13. The mobile apparatus according to claim 1, wherein the output device is further configured to output a notification event inquiring whether to continue to output the first multimedia content to the selected external apparatus.

14. A multimedia system comprising:
a mobile apparatus; and
a display apparatus comprising:
    a transceiver configured to receive, when the mobile apparatus enters a predetermined area, data that relates to multimedia content being output on the mobile apparatus from the mobile apparatus; and
    an output device configured to output the multimedia content being output on the mobile apparatus in synchronization with the multimedia content being output on the mobile apparatus, based on the received data that relates to the multimedia content,
wherein the mobile apparatus is configured to:
    determine, when the mobile apparatus enters the predetermined area, whether the mobile apparatus has connected to a network,
    select an external apparatus from among a plurality of external apparatuses accessible via the network based on a determination that the mobile apparatus has connected to the network, and
    identify the display apparatus from among the plurality of external apparatuses based on at least one predetermined criterion, a kind of multimedia content and a plurality of priorities, the plurality of priorities respectively corresponding to the plurality of external apparatuses,
wherein each of the plurality of external apparatuses is configured to output multimedia content.

15. The multimedia system according to claim 14, wherein when the display apparatus is in a power-off state, the output device is further configured to output the multimedia content after the display apparatus is powered on by the mobile apparatus.

16. The multimedia system according to claim 15, wherein the transceiver is further configured to receive, from the mobile apparatus, a signal that relates to powering on the display apparatus by using at least one from among Wake on Lan (WoL), Wake on Wireless Lan (WoWLAN), and Bluetooth.

17. The multimedia system according to claim 14, wherein when the multimedia content is stored in the mobile apparatus, the transceiver is further configured to receive streaming data that relates to the multimedia content from the mobile apparatus.

18. The multimedia system according to claim 14, wherein when the multimedia content is output on the mobile apparatus in a streaming mode, the transceiver is further configured to receive a Uniform Resource Locator (URL) address that relates to the multimedia content from the mobile apparatus.

19. The multimedia system according to claim 14, wherein when the multimedia content is output based on a Digital Multimedia Broadcasting (DMB) signal, the transceiver is further configured to receive channel information that relates to the multimedia content from the mobile apparatus.

20. The multimedia system according to claim 14, wherein the transceiver is further configured to receive data that relates to the multimedia content from the mobile apparatus by using at least one from among Wireless Fidelity (WiFi) and Bluetooth.

21. A method for outputting multimedia content comprising:
at a mobile apparatus, outputting first multimedia content; and
when the mobile apparatus enters a predetermined area, determining whether the mobile apparatus has connected to a network,
searching for a plurality of external apparatuses accessible via the network based on a determination that the mobile apparatus has connected to the network,
selecting an external apparatus from among the plurality of external apparatuses based on at least one predetermined criterion, a kind of the first multimedia content and a plurality of priorities, the plurality of priorities respectively corresponding to the plurality of external apparatuses;
transmitting data in synchronization with the first multimedia content being output on the mobile apparatus to the selected external apparatus; and
outputting the first multimedia content being output on the mobile apparatus via the selected external apparatus,
wherein each of the plurality of external apparatuses is configured to output multimedia content.

22. The method according to claim 21, wherein the outputting the first multimedia content being output on the mobile apparatus via the selected external apparatus comprises:
when the selected external apparatus is in a power-on state, receiving an input that relates to approving outputting of the first multimedia content via the selected external apparatus; and
when the input is received, outputting the first multimedia content via the selected external apparatus.

23. The method according to claim 21, wherein the outputting the first multimedia content being output on the mobile apparatus via the selected external apparatus comprises:
when the selected external apparatus is in a power-off state, powering on the selected external apparatus; and
when the selected external apparatus is powered on, outputting the first multimedia content via the selected external apparatus.

24. The method according to claim 21, wherein the outputting the first multimedia content being output on the mobile apparatus via the selected external apparatus comprises outputting second multimedia content which is synchronized with the first multimedia content via the selected external apparatus.

25. The method according to claim 21, wherein the outputting the first multimedia content being output on the mobile apparatus via the selected external apparatus comprises:
when the mobile apparatus enters the predetermined area within a predetermined time period, outputting the first multimedia content via the selected external apparatus.

26. The method according to claim 21, wherein the outputting the first multimedia content being output on the mobile apparatus via the selected external apparatus comprises:

determining whether each of the plurality of external apparatuses is in a power-off state;

if the selected external apparatus is determined to be in the power-off state, powering on the selected external apparatus; and outputting the first multimedia content via the powered-on external apparatus.

27. The method according to claim 21, wherein the outputting the first multimedia content being output on the mobile apparatus via the selected external apparatus comprises:

when the first multimedia content is stored in the mobile apparatus, transmitting streaming data that relates to the first multimedia content to the selected external apparatus.

28. The method according to claim 21, wherein the outputting the first multimedia content being output on the mobile apparatus via the selected external apparatus comprises:

when the mobile apparatus outputs the first multimedia content in a streaming mode, transmitting a Uniform Resource Locator (URL) that relates to the first multimedia content to the selected external apparatus.

29. The method according to claim 21, wherein the outputting the first multimedia content being output on the mobile apparatus via the selected external apparatus comprises:

when the mobile apparatus outputs the first multimedia content based on a Digital Multimedia Broadcasting (DMB) signal, transmitting channel information that relates to the first multimedia content to the selected external apparatus.

30. The method according to claim 21, further comprising:

when the mobile apparatus enters the predetermined area, notifying that the mobile apparatus enters the predetermined area via the selected external apparatus.

31. The method according to claim 21, further comprising:

when the selected external apparatus outputs a notification event that relates to a setting, at the mobile apparatus, outputting the notification event; and when the mobile apparatus receives an input that is responsive to the notification event, changing a setting of the selected external apparatus based on the received input.

32. The method according to claim 21, further comprising:

using at least one from among the mobile apparatus and the selected external apparatus to output a notification event inquiring whether to continue to output the first multimedia content via the selected external apparatus.

33. A mobile apparatus for outputting multimedia content comprising:

an output device configured to output first multimedia content; and a controller configured to:

determine, when the mobile apparatus enters a predetermined area, whether the mobile apparatus has connected to a network, search for a plurality of external apparatuses accessible via the network based on a determination that the mobile apparatus has connected to the network, select an external apparatus from among the plurality of external apparatuses based on at least one predetermined criterion, a kind of the first multimedia content and a plurality of priorities, the plurality of priorities respectively corresponding to the plurality of external apparatuses, transmit data in synchronization with the first multimedia content being output on the mobile apparatus to the selected external apparatus, and cause the first multimedia content to be output via the selected external apparatus, wherein each of the plurality of external apparatuses is configured to output multimedia content.

34. The mobile apparatus according to claim 33, wherein when the selected external apparatus is in a power-on state, the controller is further configured to cause the first multimedia content to be output via the selected external apparatus when an input that relates to approving outputting of the first multimedia content via the selected external apparatus is received.

35. The mobile apparatus according to claim 33, wherein when the selected external apparatus is in a power-off state, the controller is further configured to control the selected external apparatus to be powered on, and then to cause the first multimedia content to be output via the selected external apparatus.

36. The mobile apparatus according to claim 35, wherein the controller is further configured to transmit a signal for powering on the selected external apparatus by using at least one from among Wake on Lan (WoL), Wake on Wireless Lan (WoWLAN), and Bluetooth.

37. The mobile apparatus according to claim 33, wherein the controller is further configured to control the mobile apparatus to output second multimedia content which is synchronized with the first multimedia content.

* * * * *